(12) United States Patent
Ravasz et al.

(10) Patent No.: US 11,003,307 B1
(45) Date of Patent: May 11, 2021

(54) ARTIFICIAL REALITY SYSTEMS WITH DRAWER SIMULATION GESTURE FOR GATING USER INTERFACE ELEMENTS

(71) Applicant: Facebook Technologies, LLC, Menlo Park, CA (US)

(72) Inventors: Jonathan Ravasz, London (GB); Jasper Stevens, London (GB); Adam Tibor Varga, London (GB); Etienne Pinchon, London (GB); Simon Charles Tickner, Canterbury (GB); Jennifer Lynn Spurlock, Seattle, WA (US); Kyle Eric Sorge-Toomey, Seattle, WA (US); Robert Ellis, London (GB); Barrett Fox, Berkeley, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/435,086

(22) Filed: Jun. 7, 2019

(51) Int. Cl.
*G06F 3/0481* (2013.01)
*G02B 27/01* (2006.01)
*G06K 9/00* (2006.01)
*G06F 3/0482* (2013.01)

(52) U.S. Cl.
CPC ....... *G06F 3/04815* (2013.01); *G02B 27/017* (2013.01); *G06F 3/0482* (2013.01); *G06K 9/00335* (2013.01)

(58) Field of Classification Search
None
See application file for complete search history.

(56) References Cited

U.S. PATENT DOCUMENTS

| | | | | |
|---|---|---|---|---|
| 6,346,929 B1* | 2/2002 | Fukushima | ............. | G06F 3/013 345/156 |
| 6,771,294 B1* | 8/2004 | Pulli | ...................... | G06F 3/017 715/863 |
| 8,814,691 B2* | 8/2014 | Haddick | ............. | G02B 27/017 463/42 |
| 9,606,647 B1* | 3/2017 | Spencer-Harper | .... | G06F 3/0482 |
| 10,353,532 B1* | 7/2019 | Holz | ................... | G06F 3/04815 |

(Continued)

OTHER PUBLICATIONS

K. Dorfmuller-Ulhaas and D. Schmalstieg, "Finger tracking for interaction in augmented environments," Proceedings IEEE and ACM International Symposium on Augmented Reality, New York, NY, USA, 2001, pp. 55-64. (Year: 2001).*

*Primary Examiner* — Henry Orr
(74) *Attorney, Agent, or Firm* — Shumaker & Sieffert, P.A.

(57) ABSTRACT

An artificial reality system is described that renders, presents, and controls user interface elements within an artificial reality environment, and performs actions in response to one or more detected gestures of the user. The artificial reality system includes an image capture device, a head-mounted display (HMD), a user interface (UI) engine, and a rendering engine. The image capture device is configured to capture image data representative of a physical environment. The HMD is configured to output artificial reality content including a representation of a wrist. The rendering engine configured to render a user interface (UI) element. The gesture detector configured to identify a gesture that includes a gripping motion of two or more digits of a hand to form a gripping configuration at the location of the UI element, and a pulling motion away from the wrist while in the gripping configuration.

20 Claims, 13 Drawing Sheets

(56) References Cited

U.S. PATENT DOCUMENTS

| | | | | |
|---|---|---|---|---|
| 2008/0266323 | A1* | 10/2008 | Biocca | G06F 3/014 345/633 |
| 2013/0042296 | A1* | 2/2013 | Hastings | G06F 21/10 726/1 |
| 2014/0121015 | A1* | 5/2014 | Massing | G07F 17/3211 463/33 |
| 2015/0277555 | A1* | 10/2015 | Morishita | G06F 3/011 345/156 |
| 2015/0302662 | A1* | 10/2015 | Miller | G06F 3/011 345/633 |
| 2016/0109947 | A1* | 4/2016 | George-Svahn | G06F 1/169 345/156 |
| 2016/0306431 | A1* | 10/2016 | Stafford | G06F 3/0485 |
| 2019/0163266 | A1* | 5/2019 | Johnson | G06F 3/017 |

* cited by examiner

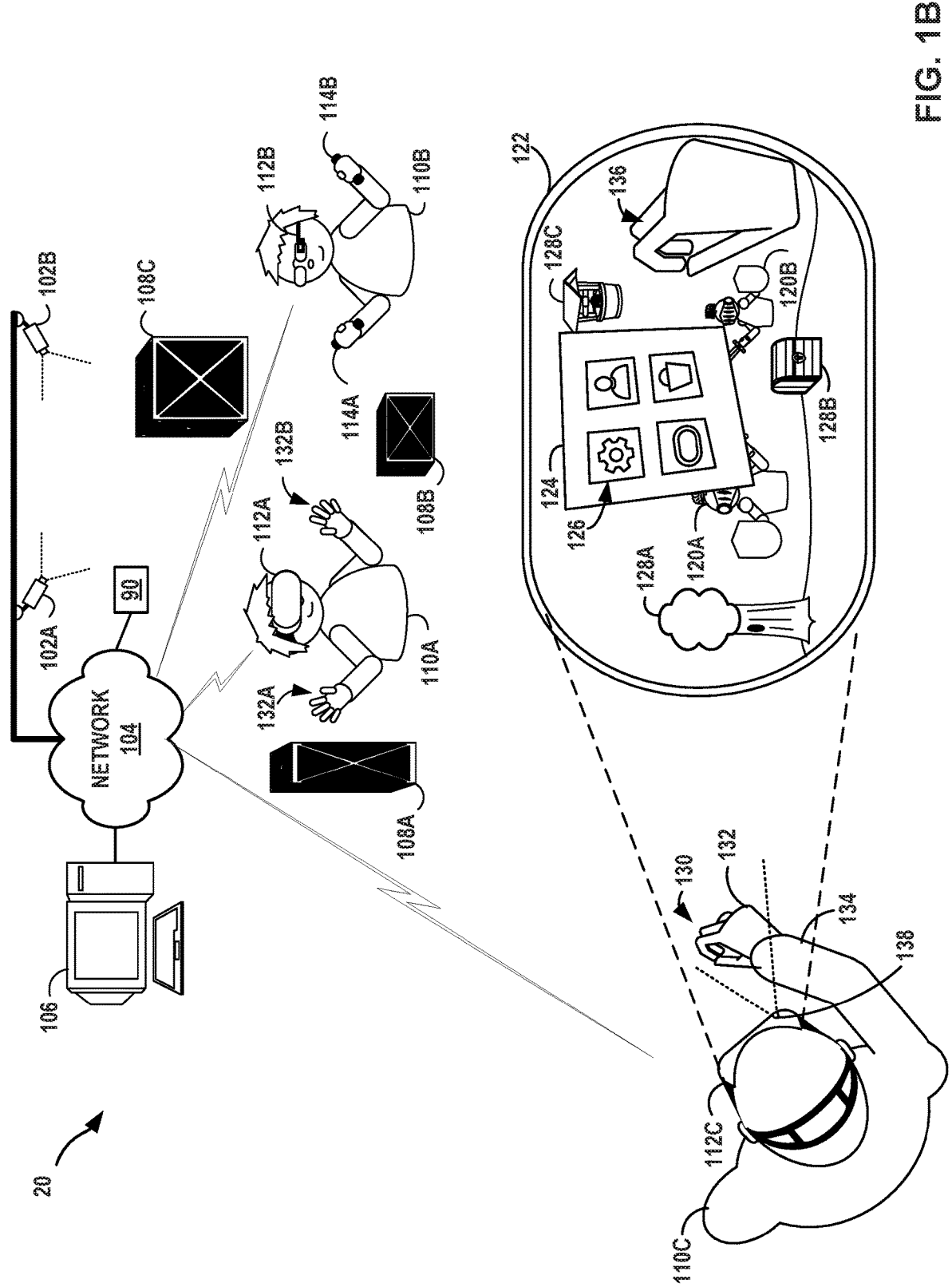

ARTIFICIAL REALITY SYSTEMS WITH DRAWER SIMULATION GESTURE FOR GATING USER INTERFACE ELEMENTS

TECHNICAL FIELD

This disclosure generally relates to artificial reality systems, such as virtual reality, mixed reality, augmented reality, and/or other computer-mediated reality systems, and more particularly, to user interfaces of artificial reality systems.

BACKGROUND

Artificial reality systems are becoming increasingly ubiquitous with applications in many fields such as computer gaming, health and safety, industrial, and education. As a few examples, artificial reality systems are being incorporated into mobile devices, gaming consoles, personal computers, movie theaters, and theme parks. In general, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof.

Typical artificial reality systems include one or more devices for rendering and displaying content to users. As one example, an artificial reality system may incorporate a head-mounted display (HMD) worn by a user and configured to output artificial reality content to the user. The artificial reality content may include completely-generated content or generated content combined with captured content (e.g., real-world video and/or images). During operation, the user typically interacts with the artificial reality system to select content, launch applications or otherwise configure the system.

SUMMARY

In general, this disclosure describes artificial reality systems and, more specifically, system configurations and techniques for presenting and controlling user interface (UI) elements within an artificial reality environment. Some examples of the techniques and system configurations of this disclosure are directed to invoking UI elements in response to detecting or identifying particular gestures performed by a user. The invocation of UI elements is also referred to throughout this disclosure as "triggering" the UI elements or "gating" the UI elements. Examples of such UI elements include, but are not limited to, menus of user-selectable options. Aspects of this disclosure are also directed to modifying a presently-rendered UI element in response to detecting certain gestures, such as by changing an orientation or data granularity-level of the UI element in response to these gestures.

For example, artificial reality systems are described that generate and render graphical UI elements for display to a user in response to detection of one or more pre-defined gestures performed by the user, as defined in a gesture library accessible to the artificial reality systems. Examples of such gestures include particular motions, movements, static configurations, moving configurations, positions, relative positions, and/or orientations of the user's hands, fingers, thumbs or arms, or a combination of pre-defined gestures. In some examples, the artificial reality system may further trigger generation and rendering of the graphical user interface elements in response to detection of particular gestures in combination with other conditions, such as the position and orientation of the particular gestures in a physical environment relative to a current field of view of the user, which may be determined by real-time gaze tracking of the user, or relative to a pose of an HMD worn by the user.

In some examples, the artificial reality system may generate and present graphical UI (GUI) elements as overlay elements with respect to the artificial reality content currently being rendered within the display of the artificial reality system. The UI elements may, for example, include, be, or be part of interactive GUI elements, such as a menu or sub-menu with which the user interacts to operate the artificial reality system. The UI elements may, in some instances, include individual GUI elements, such as elements that are selectable and/or manipulatable by a user. In various examples, such individual GUI elements include one or more of toggle (or togglable) elements, drop-down elements, menu selection elements (e.g., checkbox-based menus), two-dimensional or three-dimensional shapes, graphical input keys or keyboards, content display windows, and the like.

In one example, an artificial reality system includes an image capture device, a head-mounted display (HMD), a user interface (UI) engine, and a rendering engine. The image capture device is configured to capture image data representative of a physical environment. The HMD is configured to output artificial reality content, the artificial reality content including a representation of a wrist. The rendering engine configured to render a user interface (UI) element as an overlay to the representation of the wrist in the artificial reality content. The gesture detector configured to identify, from the image data, a gesture. The gesture includes a gripping motion of two or more digits of a hand to form a gripping configuration at a location that corresponds to the UI element overlaid on the wrist, and a pulling motion of the two or more digits away from the wrist while in the gripping configuration. The UI engine is configured to modify the UI element in response to the identified gesture to include a UI menu of user-selectable options.

In another example, a method includes capturing, by an image capture device, image data representative of a physical environment, and outputting, by the HMD, artificial reality content including a representation of a wrist. The method further includes rendering, by a rendering engine, a user interface (UI) element as an overlay to the representation of the wrist in the artificial reality content, and identifying, by a gesture detector, from the image data, a gesture. The gesture includes a gripping motion of two or more digits of a hand at a location that corresponds to the UI element overlaid on the wrist, and subsequent to the pinching motion, a pulling motion of the digits performing the gripping motion away from the wrist. The method further includes modifying, by a user interface (UI) engine, the UI element in response to the identified gesture to include a UI menu of user-selectable options.

In another example, a non-transitory computer-readable storage medium is encoded with instructions that, when executed, cause processing circuitry of an artificial reality system to receive, from a head-mounted display (HMD), image data representative of a physical environment, to output, via the HMD, artificial reality content including a representation of a wrist, to render a user interface (UI) element as an overlay to the representation of the wrist in the artificial reality content, to identify, from the image data, a gesture that includes (i) a gripping motion of two or more digits of a hand at a location that corresponds to the UI element overlaid on the wrist, and (ii) subsequent to the pinching motion, a pulling motion of the digits performing the gripping motion away from the wrist, and to modify the UI element in response to the identified gesture to include a UI menu of user-selectable options.

In another example, a system includes system includes means for capturing image data representative of a physical environment, and means for outputting, via a head-mounted display (HMD), artificial reality content including a representation of a wrist. The system further includes means for rendering a user interface (UI) element as an overlay to the representation of the wrist in the artificial reality content, and means for identifying, from the image data, a gesture. The gesture includes a gripping motion of two or more digits of a hand at a location that corresponds to the UI element overlaid on the wrist, and subsequent to the pinching motion, a pulling motion of the digits performing the gripping motion away from the wrist. The system further includes means for modifying the UI element in response to the identified gesture to include a UI menu of user-selectable options.

In this way, the system configurations and techniques of this disclosure enable a user of an artificial reality system to invoke or gate particular UI elements in the virtual environment represented by the artificial reality content by performing particular gestures. In various examples, the artificial reality system may match detected image data to predefined gestures stored to a gesture library accessible to the artificial reality system. The artificial reality systems of this disclosure may, in various implementations, populate the entries of the gesture library with predefined gestures that can be performed without having push physical or virtual buttons, and in some cases, may be performed using a single hand. Artificial reality systems of this disclosure leverage distinctive gestures during the course of regular artificial reality operation to use these particular gestures of UI element gating within the artificial reality environment.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

FIG. 1B is an illustration depicting another example artificial reality system in accordance with the techniques of the disclosure.

Like reference characters refer to like elements throughout the figures and description.

DETAILED DESCRIPTION

Figure 1A:
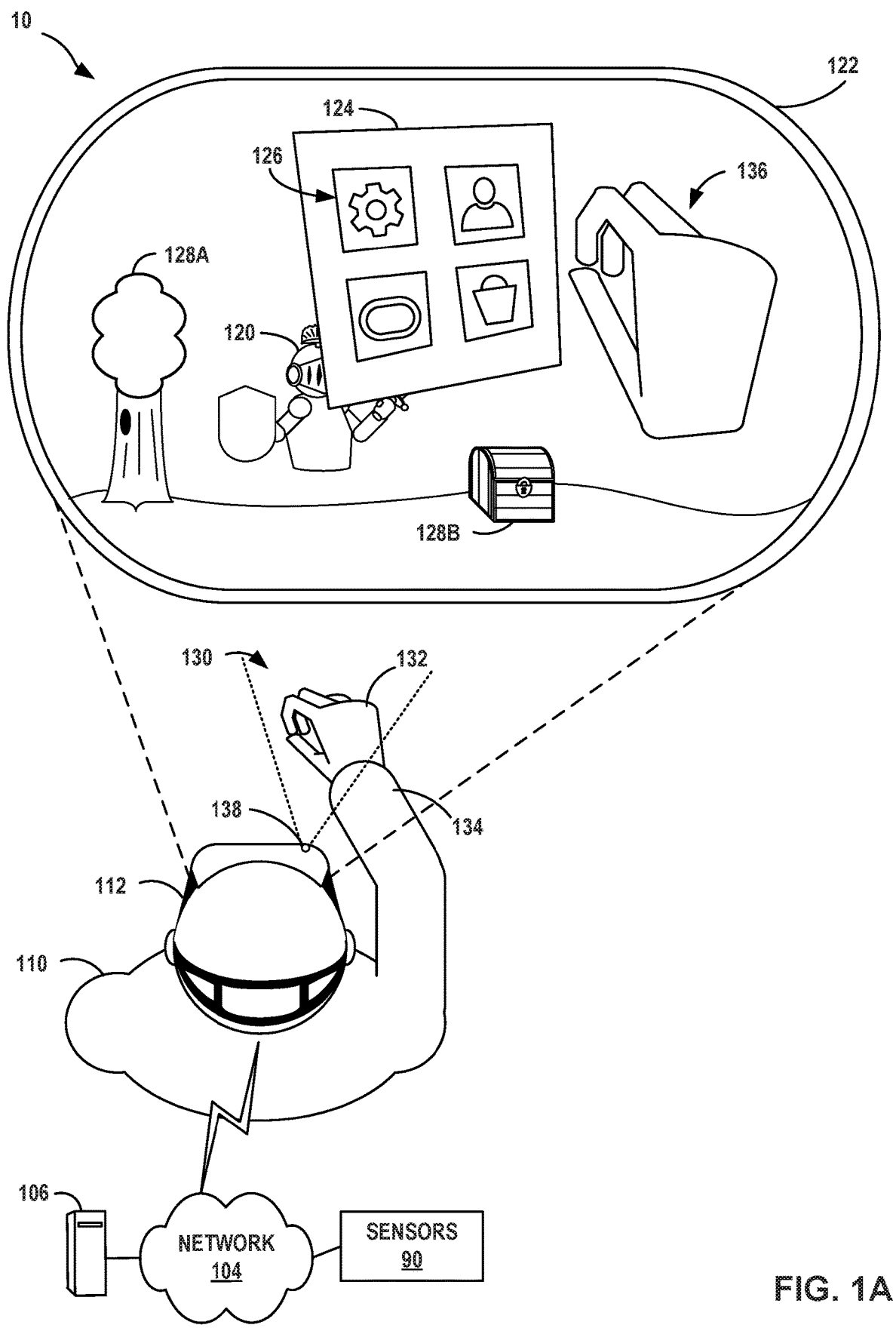
FIG. 1A is an illustration depicting an example artificial reality system that presents and controls user interface elements within an artificial reality environment in accordance with the techniques of the disclosure.

FIG. 1A is an illustration depicting an example artificial reality system 10 that presents and controls user interface elements within an artificial reality environment in accordance with the techniques of the disclosure. In some example implementations, artificial reality system 10 generates and renders graphical user interface elements to a user 110 in response to one or more gestures performed by user 110 and detected by artificial reality system 10 and/or component(s) thereof. That is, as described herein, artificial reality system 10 presents one or more graphical user interface elements 124, 126 in response to detecting one or more particular gestures performed by user 110, such as particular motions, configurations, locations, and/or orientations of the user's hands, fingers, thumbs, arms, etc.

In some examples, artificial reality system 10 may detect a predefined gesture based on additional conditions being satisfied, such as the position and orientation of portions of arm 134 (e.g., a wrist) and/or hand 132 (or digits thereof) in a physical environment in relation to a current field of view 130 of user 110, as may be determined by real-time gaze tracking of the user, or other conditions. In other examples, artificial reality system 10 presents and controls user interface elements specifically designed for user interaction and manipulation within an artificial reality environment, such as menu selection elements (e.g., a menu that includes one or more user-selectable options), specialized toggle elements, drop-down elements, graphical input keys or keyboards, content display windows, and the like.

In the example of FIG. 1A, artificial reality system 10 includes head mounted device (HMD) 112, console 106 and, in some examples, one or more external sensors 90. As shown, HMD 112 is typically worn by user 110 and includes an electronic display and optical assembly for presenting artificial reality content 122 to user 110. In addition, HMD 112 includes one or more sensors (e.g., accelerometers) for tracking motion of HMD 112. HMD 112 may include one or more image capture devices 138, e.g., cameras, line scanners, and the like. Image capture devices 138 may be configured for capturing image data of the surrounding physical environment. In this example, console 106 is shown as a single computing device, such as a gaming console, workstation, a desktop computer, or a laptop.

In other examples, console 106 may be distributed across a plurality of computing devices, such as a distributed computing network, a data center, or a cloud computing system. Console 106, HMD 112, and sensors 90 may, as shown in this example, be communicatively coupled via network 104, which may be a wired or wireless network, such as a Wi-Fi® or 5G® based network, an Ethernet network, a mesh network or a short-range wireless (e.g., Bluetooth®) communication medium. Although HMD 112 is shown in this example as in communication with, e.g., tethered to or in wireless communication with, console 106, in some implementations HMD 112 operates as a stand-alone, mobile artificial reality system.

In general, artificial reality system 10 uses information captured from a real-world, three-dimensional (3D) physical environment to render artificial reality content 122 for display to user 110. In the example of FIG. 1A, user 110 views the artificial reality content 122 constructed and rendered by an artificial reality application executing on console 106 and/or HMD 112. As one example, artificial reality content 122 may be a consumer gaming application in which user 110 is rendered as avatar 120 with one or more virtual objects 128A, 128B. In some examples, artificial reality content 122 may comprise a mixture of real-world imagery and virtual objects, e.g., mixed reality and/or augmented reality. In other examples, artificial reality content 122 may be, e.g., a video conferencing application, a navigation application, an educational application, training or simulation applications, or other types of applications that implement artificial reality.

During operation, the artificial reality application constructs artificial reality content 122 for display to user 110 by tracking and computing pose information for a frame of reference, typically a viewing perspective of HMD 112. Using HMD 112 as a frame of reference, and based on a current field of view 130 as determined by a current estimated pose of HMD 112, the artificial reality application renders 3D artificial reality content which, in some examples, may be overlaid, at least in part, upon the real-world, 3D physical environment of user 110. During this process, the artificial reality application uses sensed data received from HMD 112, such as movement information and user commands, and, in some examples, data from any external sensors 90, such as external cameras 102A and/or 102B, to capture 3D information within the real world, physical environment, such as motion by user 110 and/or feature tracking information with respect to user 110. Based on the sensed data, the artificial reality application determines a current pose for the frame of reference of HMD 112 and, in accordance with the current pose, renders the artificial reality content 122.

Moreover, in accordance with the techniques of this disclosure, based on the sensed data, the artificial reality application detects gestures performed by user 110 and, in response to detecting one or more particular gestures, generates one or more user interface elements, e.g., UI menu 124 and UI element 126, which may be overlaid on underlying artificial reality content 122 being presented to user 110. In this respect, user interface elements 124, 126 may be viewed as part of the artificial reality content 122 being presented to user 110 in the artificial reality environment. In this way, artificial reality system 10 dynamically presents one or more graphical user interface elements 124, 126 in response to detecting one or more particular gestures by user 110, such as particular motions, configurations, positions, and/or orientations of the user's hands, fingers, thumbs or arms. Example configurations of a user's hand may include a fist, a partial fist with one or more digits extended, an open hand with all digits extended, a gripping configuration in which two or more fingers encircle a virtual object, the relative and/or absolute positions and orientations of one or more of the individual digits of hand 132, the shape of the palm of the hand (e.g., substantially flat, cupped, etc.), and so on.

The user interface elements may, for example, include, be, or be part of a graphical user interface, such as a menu or sub-menu with which user 110 interacts to operate the artificial reality system, or individual user interface elements selectable and manipulatable by user 110, such as toggle elements, drop-down elements, menu selection elements, two-dimensional or three-dimensional shapes, graphical input keys or keyboards, content display windows and the like. While depicted as a two-dimensional element, for example, UI element 126 may be a two-dimensional or three-dimensional shape that is manipulatable by user 110 by performing gestures to translate, scale, and/or rotate the shape within the virtual environment represented by artificial reality content 122.

Moreover, as described herein, in some examples, artificial reality system 10 may trigger generation and rendering of graphical user interface elements 124, 126 in response to other conditions, such as a current state of one or more applications being executed by the system, or the position and orientation of the particular detected gestures in a physical environment in relation to a current field of view 130 of user 110, as may be determined by real-time gaze tracking of the user, or other conditions. More specifically, as further described herein, image capture devices 138 of HMD 112 capture image data representative of objects in the real world, physical environment that are within a field of view 130 of image capture devices 138. Field of view 130 typically corresponds with the viewing perspective of HMD 112.

In some examples, such as the illustrated example of FIG. 1A, the artificial reality application renders the portions of hand 132 of user 110 that are within field of view 130 as a virtual hand 136 within artificial reality content 122. In other examples, the artificial reality application may present a real-world image of hand 132 and/or arm 134 of user 110 within artificial reality content 122 comprising mixed reality, augmented reality, and/or any other combination of information directly reproducing a physical environment with computer-mediated content. In either example, user 110 is able to view the portions of his/her hand 132 and/or arm 134 that are within field of view 130 as objects within the virtual environment represented by artificial reality content 122. In other examples, the artificial reality application may not render hand 132 or arm 134 of user 110 at all within artificial reality content 122.

During operation, artificial reality system 10 performs object recognition within image data captured by image capture devices 138 of HMD 112 (and/or by external cameras 102) to identify hand 132, including optionally identifying individual fingers or the thumb, and/or all or portions of arm 134 of user 110. Further, artificial reality system 10 tracks the position, orientation, and configuration of hand 132 (optionally including particular digits of the hand) and/or portions of arm 134 over a sliding window of time. The artificial reality application analyzes any tracked motions, configurations, positions, and/or orientations of hand 132 and/or portions of arm 134 to identify one or more gestures performed by particular objects, e.g., hand 132 (including but not limited to one or more particular digits of hand 132) and/or portions of arm 134 (or specific portions thereof, such as a wrist) of user 110.

To detect the gesture(s), the artificial reality application may compare the motions, configurations, positions and/or orientations of hand 132 and/or portions of arm 134 to gesture definitions stored in a gesture library of artificial reality system 10, where each gesture in the gesture library may be each mapped to one or more actions. In some examples, detecting movement may include tracking positions of one or more of the digits (individual fingers and thumb) of hand 132, including whether any of a defined combination of the digits (such as an index finger and thumb) are brought together to touch or approximately touch in the physical environment, or to bookend or encircle a user interface element (e.g., an assistant element or a display element) presented as part of artificial reality content 122. In other examples, detecting movement may include tracking an orientation of hand 132 (e.g., fingers pointing toward HMD 112 or away from HMD 112) and/or an orientation of arm 134 (i.e., the normal of the arm facing toward HMD 112) relative to the current pose of HMD 112. The position and orientation of the respective portion or entirety of hand 132 or arm 134 thereof may alternatively be referred to as the pose of hand 132 or arm 134, or a configuration of hand 132 or arm 134.

Moreover, the artificial reality application may analyze configurations, motions, positions, and/or orientations of hand 132 and/or arm 134 to identify a gesture that includes hand 132 and/or arm 134 being held in one or more specific configuration, movement, positions, and/or orientations for at least a threshold period of time. As examples, one or more particular positions at which hand 132 and/or arm 134 are being held substantially stationary within field of view 130 for at least a configurable period of time may be used by artificial reality system 10 as an indication that user 110 is attempting to perform a gesture intended to trigger a desired response by the artificial reality application, such as triggering display of a particular type of user interface element 124, 126, such as a menu.

As another example, one or more particular configurations of the digits (fingers or thumb) and/or palms of hand 132 and/or arm 134 being maintained within field of view 130 for at least a configurable period of time may be used by artificial reality system 10 as an indication that user 110 is attempting to perform a gesture. For instance, artificial reality system 10 may use the detected image data as an indication that user 110 is attempting to perform a predefined gesture stored to a gesture library accessible to artificial reality system 10. Although only a right hand and a right arm of user 110 are illustrated in FIG. 1A as hand 132 and right arm 134, it will be appreciated that, in various examples, artificial reality system 10 may identify a left hand and/or arm of user 110 or both right and left hands and/or arms of user 110 for the gesture detection techniques of this disclosure. In this way, artificial reality system 10 may detect single-handed gestures performed by either hand, double-handed gestures, or arm-based gestures within the physical environment, and generate associated user interface elements in response to the detected gestures.

In accordance with some examples of the system configurations and techniques of this disclosure, the artificial reality application running on artificial reality system 10 determines whether an identified gesture corresponds to a predefined gesture defined by one of a plurality of entries in a gesture library. The gesture library may be stored locally at or otherwise accessible to console 106 and/or HMD 112. As described in more detail below, each of the entries in the gesture library may define a different gesture as a specific motion, configuration, position, and/or orientation of a user's hand, digit (finger or thumb) and/or arm over time, or a combination of such properties. In addition, each of the defined gestures may be associated with a desired response in the form of one or more actions to be performed by the artificial reality application.

As one example, one or more of the predefined gestures in the gesture library may trigger the generation, transformation, and/or configuration of one or more user interface elements, e.g., UI menu 124, to be rendered and overlaid on artificial reality content 122, where the gesture may define a location and/or orientation of UI menu 124 in artificial reality content 122. As another example, one or more of the defined gestures may indicate an interaction by user 110 with a particular user interface element, e.g., selection of UI element 126 of UI menu 124, to trigger a change to the presented user interface, presentation of a sub-menu of the presented user interface, or the like.

Again, some examples of the techniques and system configurations of this disclosure are directed to invoking UI elements in response to detecting or identifying particular gestures performed by a user. The invocation of UI elements is also referred to throughout this disclosure as "triggering" the UI elements or "gating" the UI elements. Examples of such UI elements include, but are not limited to, menus of user-selectable options. Aspects of this disclosure are also directed to modifying a presently-rendered UI element in response to detecting certain gestures, such as by changing an orientation or data granularity-level of the UI element in response to these gestures. Examples of gestures that artificial reality system 10 may use for gating purposes include the positioning of hand 132 in certain configurations for a threshold period of time, or certain configurations and movements of hand 132 at locations that correspond to virtual locations of already-displayed UI elements. As used herein, the term "gating" refers to the generation and rendering of certain UI elements that were not displayed in the virtual environment until the gating event occurs.

According to some of the techniques described herein, the artificial reality application running on artificial reality system 10 performs UI element gating in response to detecting gestures in which hand 132 is configured such that two of the digits form approximately a right angle. For example, artificial reality system 10 detects the gating gesture if an index finger and a thumb of hand 132 form approximately a right angle. In some examples, artificial reality system 10 adds a temporal component to the criteria for the gating gesture to be recognized. That is, artificial reality system 10 may identify the gesture if the configuration of hand 132 is substantially stationary for at least a threshold period of time, and during the period of time during which hand 132 is stationary, and hand 132 is positioned such that the index finger and the thumb of hand 132 form approximately a right angle. It will be appreciated that, while the position of hand 132 is described herein as forming an "angle" as represented by a turn between two straight lines, artificial reality system 10 adjusts the angle determination of this disclosure to accommodate human anatomical idiosyncrasies, such as the curvature of the webbing between the thumb and index finger, any natural bends caused by inter-phalange joints of the fingers of hand 132, etc.

In some examples, artificial reality system 10 identifies different gating gestures based on the orientation of hand 132 when the index finger and thumb are positioned approximately at the right angle. For example, artificial reality system 10 may identify one gating gesture if a back surface of hand 132 is facing HMD 112, and may identify a different gating gesture if a palm of hand 132 is facing HMD 112. That is, artificial reality system 10 may identify the gating gesture based on certain attributes of hand 132 while hand 132 (or a particular portion thereof) is within the field of view (FoV) of user 110 while user 110 is wearing HMD 112. As another example, artificial reality system 10 may identify one gating gesture if the thumb of hand 132 is facing upwards in the FoV of HMD 112, and may identify a different gating gesture if the index finger of hand 132 is facing upwards in the FoV of HMD 112. In some examples, artificial reality system 10 may recognize the particular gestures based on a combination of the various orientation attributes of hand 132 described above.

According to some techniques of this disclosure, artificial reality system 10 detects a gating gesture if hand 132 is positioned substantially stationary for at least the threshold period of time, and the digits of hand 132 are positioned such that such that the thumb and at least one other finger of hand 132 form approximately a circle or approximately a circular segment. In some examples, artificial reality system 10 may detect the gesture if the view of hand 132 facing the FoV of HMD 112 is a sideways orientation, and represents the side of hand 132 on which the thumb is located. For instance, the normal drawn from HMD 112 to hand 132 may intersect with the inside area of the circle or circular segment formed by the thumb and the other finger(s) of hand 132. It will be appreciated that, while the configuration of hand 132 is described herein as approximately forming the geometric shapes of a "circle" or a "circular segment", artificial reality system 10 adjusts the angle determination of this disclosure to accommodate human anatomical idiosyncrasies, such as the sharper bends caused by inter-phalange joints of the fingers of hand 132, folds in the webbing between the thumb and index finger, etc. In these examples, artificial reality system 10 may gate a UI element at a virtual location corresponding to the space between the virtual representations of the index finger and thumb.

According to some techniques of this disclosure, artificial reality system 10 detects a gating gesture if a portion of arm 134 is positioned substantially stationary for at least the threshold period of time, and is in the FoV of HMD 112 for at least the threshold period of time. For example, artificial reality system 10 may detect the gesture if the configuration of arm 134 is such that a wrist is substantially stationary for at least a threshold period of time, and the wrist is positioned such that a normal from the wrist faces the FoV of HMD 112. In some examples, artificial reality system 10 may detect the gesture if the view of arm 134 facing external cameras 102 and/or image capture devices 138 of HMD 112 is a sideways orientation, and represents the inner side of the wrist, i.e. the side on which the thumb of hand 132 is located. For instance, the normal drawn from HMD 112 to hand 132 may intersect with the inside surface of the wrist of arm 134. In these examples, artificial reality system 10 may gate a UI element at a virtual location corresponding to a representation of the opposite wrist.

According to some techniques of this disclosure, artificial reality system 10 adds a display element to artificial reality content 122 output by HMD 112 for user 110 to view. The display element may, in some cases, be referred to as an "assistant" with respect to the gating techniques described herein. According to these examples, artificial reality system 10 may detect certain predefined gestures performed at locations generally corresponding to the location of the display element to gate UI elements within artificial reality content 122.

In some implementations, a UI engine of artificial reality system 10 may generate an assistant element to simulate a drone, in that the assistant element hovers over or alongside a virtual representation (e.g. an avatar) of user 110, e.g., alongside virtual hand 136, in the virtual environment represented by artificial reality content 122. In these implementations, artificial reality system 10 may detect the gesture based on a grip-and-throw combination performed by hand 132 with respect to the assistant element included in artificial reality content 122.

For example, artificial reality system 10 may detect a gating gesture if artificial reality system 10 identifies a combination of (1) a gripping motion of two or more digits of hand 132 to form a gripping configuration at a location that corresponds to the assistant element within the virtual environment represented by artificial reality content 122, and (2) a throwing motion of hand 132 with respect to the assistant element, where the throwing motion occurs subsequent to the gripping motion. For instance, artificial reality system 10 may detect the throwing motion by identifying a combination of a release of the gripping configuration of hand 132 and a particular movement of hand 132 and/or arm 134. The particular movement that accompanies, follows, or partially overlaps with the release of the gripping configuration may include one or more of a flexion of hand 132 or the wrist of arm 134, an outward flicking motion of at least one of the digits of hand 132, or the like. In these examples, artificial reality system 10 may gate a UI element at a virtual location corresponding to where the assistant element was virtually thrown.

In some implementations, the UI engine of artificial reality system 10 may generate the display element to simulate a wearable or partially-adhesive entity. For instance, the UI engine of artificial reality system 10 may cause a rendering engine of artificial reality system 10 to output the display element at a location corresponding to a representation of an opposite arm of user 110 (i.e., the arm other arm 134). In one example, the UI engine and the rendering engine of artificial reality system 10 render the display element to appear superimposed on and attached to the opposite arm of user 110. In some such implementations, artificial reality system 10 may detect the gesture based on a grip-and-move combination, a grip-and-release combination, a grip-move-release combination, or simply a grip performed by hand 132 with respect to the assistant element that appears superimposed on and attached to the opposite arm of user 110.

For example, artificial reality system 10 may detect the gesture by identifying a gripping motion of hand 132 with respect to the display element that is placed on the opposite arm of user 110 in the virtual environment represented by artificial reality content 122. In response to the identification of the gesture, artificial reality system 10 may update the display element to appear detached and separate from the opposite arm of user 110. Artificial reality system 10 may also gate a UI element in response to the identification of the predefined gesture. For example, the UI engine and rendering engine of artificial reality system 10 may invoke a menu of user-selectable options within the virtual environment represented by artificial reality system 122. In some instances, artificial reality system 10 may position the UI element next to or otherwise in the general vicinity of the display element, while the display element still appears detached and separate from the opposite arm of user 110.

In some implementations, artificial reality system 10 may gate a UI element (e.g., a menu of user-selectable options), in response to identifying movements such as a grip-and-pull combination or a pinch-and-pull combination that originates at a predefined area of the other arm of user 110, such as at the wrist of the other arm. According to some of these implementations, the UI engine and the rendering engine of artificial reality system 10 may output a UI element as an overlay to a representation of the wrist of the other arm in artificial reality content 122.

In these implementations, the UI engine and the rendering engine of artificial reality system 10 may gate the UI menu by modifying the UI element, in response to identifying a grip-and-pull combination motion of hand 132 with respect to the UI element virtually overlaid on the wrist. For example, artificial reality system 10 may identify a gripping motion of two or more digits of hand 132 to form a gripping configuration, and a subsequent pulling motion of the same two or more digits away from the wrist of the other hand, while the same two or more digits are in the gripping configuration. That is, artificial reality system 10 may detect the gripping configuration at the location, within the virtual environment represented by artificial reality content 122, of the UI element overlaid on the wrist. In this way, these particular aspects of this disclosure described above simulate a drawer or filing cabinet in terms of invoking UI elements.

Accordingly, the techniques and system configurations of this disclosure provide specific technical improvements to the computer-related field of rendering and displaying content by an artificial reality system. For example, artificial reality systems as described herein may provide a high-quality artificial reality experience to a user, such as user 110, of the artificial reality application by generating and rendering user interface elements overlaid on the artificial reality content based on detection of intuitive, yet distinctive, gestures performed by the user.

Further, systems as described herein may be configured to detect certain gestures based on hand and arm movements that are defined to avoid tracking occlusion. Tracking occlusion may occur when one hand of the user at least partially overlaps the other hand, making it difficult to accurately track the individual digits (fingers and thumb) on each hand, as well as the position and orientation of each hand. Systems as described herein, therefore, may be configured to primarily detect single-handed or single arm-based gestures. The use of single-handed or single arm-based gestures may further provide enhanced accessibility to users having large- and fine-motor skill limitations. Furthermore, systems as described herein may be configured to detect double-handed or double arm-based gestures in which the hands of the user do not interact or overlap with each other.

In addition, systems as described herein may be configured to detect gestures that provide self-haptic feedback to the user. For example, a thumb and one or more fingers on each hand of the user may touch or approximately touch in the physical world as part of a pre-defined gesture indicating an interaction with a particular user interface element in the artificial reality content. The touch between the thumb and one or more fingers of the user's hand may provide the user with a simulation of the sensation felt by the user when interacting directly with a physical user input object, such as a button on a physical keyboard or other physical input device.

In various examples, to perform the gesture detection/identification aspects of the techniques described above, artificial reality system 10 may match detected image data to predefined gestures stored to a gesture library accessible to artificial reality system 10. Artificial reality system 10 may, in various implementations, populate the entries of the gesture library with predefined gestures that do not necessarily call for an interaction with virtual controller or a physical device. Artificial reality system 10 may also include a UI engine configured to generate various elements described herein, whether in response to particular stimuli or not. Artificial reality system 10 may also include a rendering engine configured to render artificial reality content 122.

In this way, artificial reality system may be configured according to various aspects of this disclosure to enable user 110 to invoke or gate particular UI elements in the artificial reality-enhanced physical environment by performing particular gestures. By using predefined gestures that are easy to perform and do not require user 110 to hold a physical device, artificial reality system 10 of this disclosure leverages the ease of performing these gestures during the course of regular artificial reality operation to use these particular gestures of UI element gating within the virtual environment represented by artificial reality content 122.

FIG. 1B is an illustration depicting another example artificial reality system 20 in accordance with the techniques of the disclosure. Similar to artificial reality system 10 of FIG. 1A, in some examples, artificial reality system 20 of FIG. 1B may present and control user interface elements specifically designed for user interaction and manipulation within an artificial reality environment. Artificial reality system 20 may also, in various examples, generate and render certain graphical user interface elements to a user in response detection of to one or more particular gestures of the user.

In the example of FIG. 1B, artificial reality system 20 includes external cameras 102A and 102B (collectively, "external cameras 102"), HMDs 112A-112C (collectively, "HMDs 112"), controllers 114A and 114B (collectively, "controllers 114"), console 106, and sensors 90. As shown in FIG. 1B, artificial reality system 20 represents a multi-user environment in which an artificial reality application executing on console 106 and/or HMDs 112 presents artificial reality content to each of users 110A-110C (collectively, "users 110") based on a current viewing perspective of a corresponding frame of reference for the respective user 110. That is, in this example, the artificial reality application constructs artificial content by tracking and computing pose information for a frame of reference for each of HMDs 112. Artificial reality system 20 uses data received from cameras 102, HMDs 112, and controllers 114 to capture 3D information within the real-world environment, such as motion by users 110 and/or tracking information with respect to users 110 and objects 108, for use in computing updated pose information for a corresponding frame of reference of HMDs 112. As one example, the artificial reality application may render, based on a current viewing perspective determined for HMD 112C, artificial reality content 122 having virtual objects 128A-128C (collectively, "virtual objects 128") as spatially overlaid upon real world objects 108A-108C (collectively, "real world objects 108"). Further, from the perspective of HMD 112C, artificial reality system 20 renders avatars 120A, 120B based upon the estimated positions for users 110A, 110B, respectively.

Each of HMDs 112 concurrently operates within artificial reality system 20. In the example of FIG. 1B, each of users 110 may be a "player" or "participant" in the artificial reality application, and any of users 110 may be a "spectator" or "observer" in the artificial reality application. HMD 112C may each operate substantially similar to HMD 112 of FIG. 1A by tracking hand 132 and/or arm 124 of user 110C, and rendering the portions of hand 132 that are within field of view 130 as virtual hand 136 within artificial reality content 122. HMD 112B may receive user inputs from controllers 114A held by user 110B. HMD 112A may also operate substantially similar to HMD 112 of FIG. 1A and receive user inputs by tracking movements of hands 132A, 132B of user 110A. HMD 112B may receive user inputs from controllers 114 held by user 110B. Controllers 114 may be in communication with HMD 112B using near-field communication of short-range wireless communication such as Bluetooth®, using wired communication links, or using another type of communication links.

In a manner similar to the examples discussed above with respect to FIG. 1A, console 106 and/or HMD 112C of artificial reality system 20 generates and renders user interface elements 124, 126, which may be overlaid upon the artificial reality content 122 displayed to user 110C. Moreover, console 106 and/or HMD 112C may trigger the generation and dynamic display of the user interface elements 124, 126 based on detection, via pose tracking, of intuitive, yet distinctive, gestures performed by user 110C. For example, artificial reality system 20 may dynamically present one or more graphical user interface elements 124, 126 in response to detecting one or more particular gestures by user 110C, such as particular motions, configurations, positions, and/or orientations of the user's hands, fingers, thumbs, or arms. As shown in FIG. 1B, in addition to image data captured via camera 138 of HMD 112C, input data from external cameras 102 may be used to track and detect particular motions, configurations, positions, and/or orientations of hands and arms of users 110, such as hand 132 of user 110C, including movements of individual and/or combinations of digits (fingers, thumb) of hand 132. External cameras 102 and/or image capture devices 138 of HMD 112 are referred to collectively as the "image capture device(s)" of artificial reality system 20, as it will be appreciated that the artificial reality application running on artificial reality system 20 may capture image data of the physical environment and of the various gestures described herein using any one or more of these image capture device(s).

In accordance with techniques described in this disclosure, artificial reality system 20 may detect one or more particular configurations of the digits (fingers or thumb) and/or palms of hand 132 and/or arm 134 of user 110C being maintained within field of view 130 for at least a configurable period of time, and interpret the held configuration as an indication that the respective user 110C is attempting to perform a gesture. For instance, artificial reality system 20 may use the detected image data as an indication that user 110C is attempting to perform a predefined gesture stored to a gesture library accessible to artificial reality system 20. Although only a right hand and a right arm of user 110C are illustrated in FIG. 1B as hand 132 and right arm 134, it will be appreciated that, in various examples, artificial reality system 20 may identify a left hand and/or arm of the respective user 110C or both right and left hands and/or arms of the respective user 110C for the gesture detection techniques of this disclosure.

In this way, artificial reality system 20 may detect single-handed gestures performed by either hand, double-handed gestures, or arm-based gestures within the physical environment, and generate associated user interface elements in response to the detected gestures. By leveraging hand-only gestures, hand-and-wrist-only gestures, single-handed gestures, and/or by gestures in which not all of the digits of hand 132 are required for gesture detection, artificial reality system 20 improves accessibility to users 110, to accommodate disabilities, anatomical idiosyncrasies, injuries, temporary illnesses, etc.

The artificial reality application running on artificial reality system 20 may gate (or "trigger") the generation, rendering, transformation, and/or configuration of one or more user interface elements, e.g., UI menu 124, to be rendered and overlaid on artificial reality content 122, where the gesture may define a location and/or orientation of UI menu 124 in artificial reality content 122. As described above in further detail with respect to FIG. 1A, in accordance with various examples of the system configurations and techniques of this disclosure, the artificial reality application running on artificial reality system 20 may gate the UI element(s) in response to detecting a single-handed gesture performed by hand 132 in which two digits form approximately a right angle (e.g. to form approximately an 'L' shape or a mirror image of an approximate 'L' shape). According to other techniques and system configurations of this disclosure, the artificial reality application running on artificial reality system 20 detects a gating gesture if hand 132 is positioned substantially stationary for at least the threshold period of time, and the digits of hand 132 are positioned such that such that the thumb and at least one other finger of hand 132 form approximately a circle (e.g., an approximate 'O' shape, an approximate 'C' shape, or a mirror image of an approximate 'C' shape).

According to other techniques and system configurations of this disclosure, the artificial reality application running on artificial reality system 20 detects a gating gesture if a particular surface of the wrist of the respective arm 134 is positioned substantially stationary for at least the threshold period of time, and is in the field of view (FoV) of HMD for at least the threshold period of time. According to some techniques of this disclosure, the artificial reality application running on artificial reality system 20 adds a display element (e.g., also referred to as an "assistant element" in this disclosure) to artificial reality content 122 output by HMD 112. According to these examples, artificial reality system 20 may detect certain predefined gestures performed at locations generally corresponding to the location of the display element to gate UI elements within artificial reality content 122. Examples of gating gestures that artificial reality system 20 may detect with respect to the display or assistant element include a grip-and-pull from the wrist of an opposite arm (i.e. not arm 134) of the respective user 110C when the display/assistant element is superimposed on a representation of the wrist of the opposite arm, a grip-and-throw of the display/assistant element when the display/assistant element is presented as traveling with the avatar of the respective user 110C in the virtual environment represented by artificial reality content 122, or a grip-and-detach from the opposite arm when the display/assistant element is superimposed on a representation of the wrist of the other arm.

Figure 2:
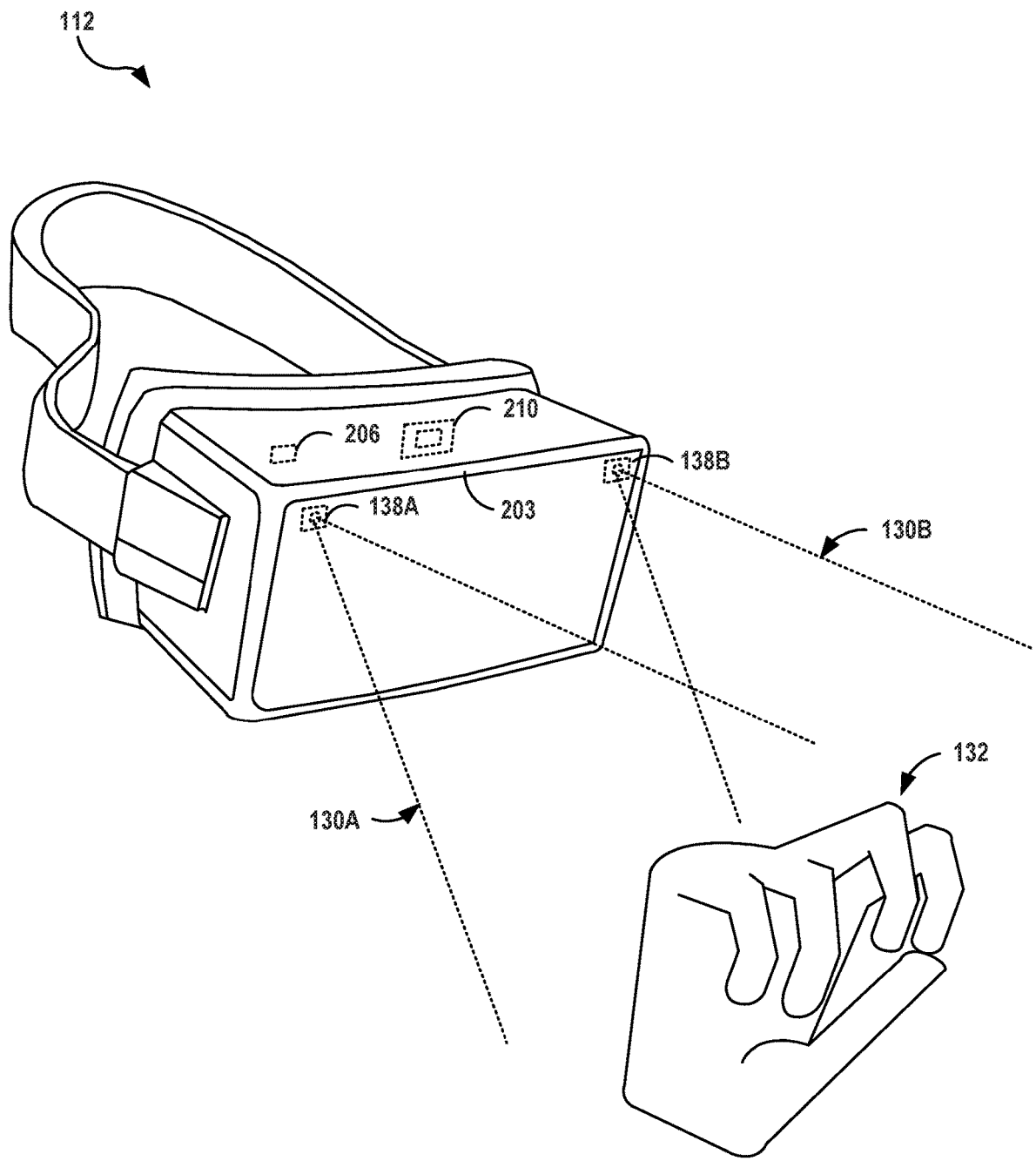
FIG. 2 is an illustration depicting an example HMD that operates in accordance with the techniques of the disclosure.

FIG. 2 is an illustration depicting an example HMD 112 configured to operate in accordance with the techniques of the disclosure. HMD 112 of FIG. 2 may be an example of any of HMDs 112 of FIGS. 1A and 1B. HMD 112 may be part of an artificial reality system, such as artificial reality systems 10, 20 of FIGS. 1A, 1B, or may operate as a stand-alone, mobile artificial realty system configured to implement the techniques described herein.

In this example, HMD 112 includes a front rigid body and a band to secure HMD 112 to a user. In addition, HMD 112 includes an interior-facing electronic display 203 configured to present artificial reality content to the user. Electronic display 203 may include, be, or be part of any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, the electronic display is a stereoscopic display for providing separate images to each eye of the user. In some examples, the known orientation and position of display 203 relative to the front rigid body of HMD 112 is used as a frame of reference, also referred to as a local origin, when tracking the position and orientation of HMD 112 for rendering artificial reality content according to a current viewing perspective of HMD 112 and the user. In other examples, HMD may take the form of other wearable head mounted displays, such as glasses.

As further shown in FIG. 2, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar, or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, laser scanners, Doppler® radar scanners, depth scanners, or the like, configured to output image data representative of the physical environment.

More specifically, image capture devices 138 capture image data representative of objects in the physical environment that are within a field of view 130A, 130B of image capture devices 138, which typically corresponds with the viewing perspective of HMD 112. HMD 112 includes an internal control unit 210, which may include an internal power source and one or more printed-circuit boards having one or more processors, memory, and hardware to provide an operating environment for executing programmable operations to process sensed data and present artificial reality content on display 203.

In one example, in accordance with the techniques described herein, control unit 210 is configured to identify, based on the sensed data, a specific gesture or one or more combinations of gestures performed by user 110. Control unit 210 may perform one or more particular actions in response to identifying or detecting the gesture or combination(s) of gestures. For example, in response to one identified gesture, control unit 210 may generate and render a specific user interface element overlaid on artificial reality content for display on electronic display 203. As explained herein, in accordance with the techniques of the disclosure, control unit 210 may perform object recognition within image data captured by image capture devices 138 to identify hand 132 (or digits, such as fingers or thumb thereof), arm 134 (or the wrist thereof) or another part of user 110, and track movements of the identified part to identify pre-defined gestures performed by user 110.

In response to identifying a predefined gesture (or combination/sequence thereof), control unit 210 takes some action, such as gating a menu, selecting an option from an option set associated with a user interface element (e.g., the aforementioned menu), translating the gesture into input (e.g., characters), launching an application or otherwise displaying content, and the like. In some examples, control unit 210 dynamically gates (generates and presents) a user interface element, such as a menu, in response to detecting a pre-defined gesture specified as a "trigger" for revealing a user interface or a specific element thereof, such as a menu of user-selectable options. In other examples, control unit 210 performs such functions in response to direction from an external device, such as console 106, which may perform, object recognition, motion tracking and gesture detection, or any part thereof.

As one example, in accordance with various aspects of this disclosure, control unit 210 may gate the UI element(s) in response to detecting a single-handed gesture performed by hand 132 in which two digits form approximately a right angle (e.g. to form approximately an 'L' shape or a mirror image of an approximate 'L' shape). According to other techniques and system configurations of this disclosure, control unit 210 detects or identifies a gating gesture if hand 132 is positioned substantially stationary for at least the threshold period of time, and the digits of hand 132 are positioned such that the thumb and at least one other finger of hand 132 form approximately a circle (e.g., an approximate 'O' shape, an approximate 'C' shape, or a mirror image of an approximate 'C' shape).

As additional examples, according to other techniques and system configurations of this disclosure, control unit 210 detects or identifies a gating gesture if a particular surface of the wrist of arm 134 is positioned substantially stationary for at least the threshold period of time, and is in the FoV of HMD 112 for at least the threshold period of time. According to some aspects of this disclosure, control unit 210 adds a display element (e.g., also referred to as an "assistant element" at times in this disclosure) to artificial reality content 122 output by HMD 112. According to these examples, control unit 210 may detect certain predefined gestures performed at locations generally corresponding to the location of the display element to gate UI elements within artificial reality content 122 displayed via HMD 112.

Examples of gating gestures that control unit 210 may detect with respect to the display or assistant element include a grip-and-pull from the wrist of the other arm (i.e. not arm 134) of user 110 when the display/assistant element is superimposed on a representation of the wrist of the other arm, a grip-and-throw of the display/assistant element when the display/assistant element is presented as traveling with the avatar of the respective user 110 in the virtual environment represented by artificial reality content 122, or a grip-and-detach from the other arm when the display/assistant element is superimposed on a representation of the wrist of the other arm.

Figure 3:
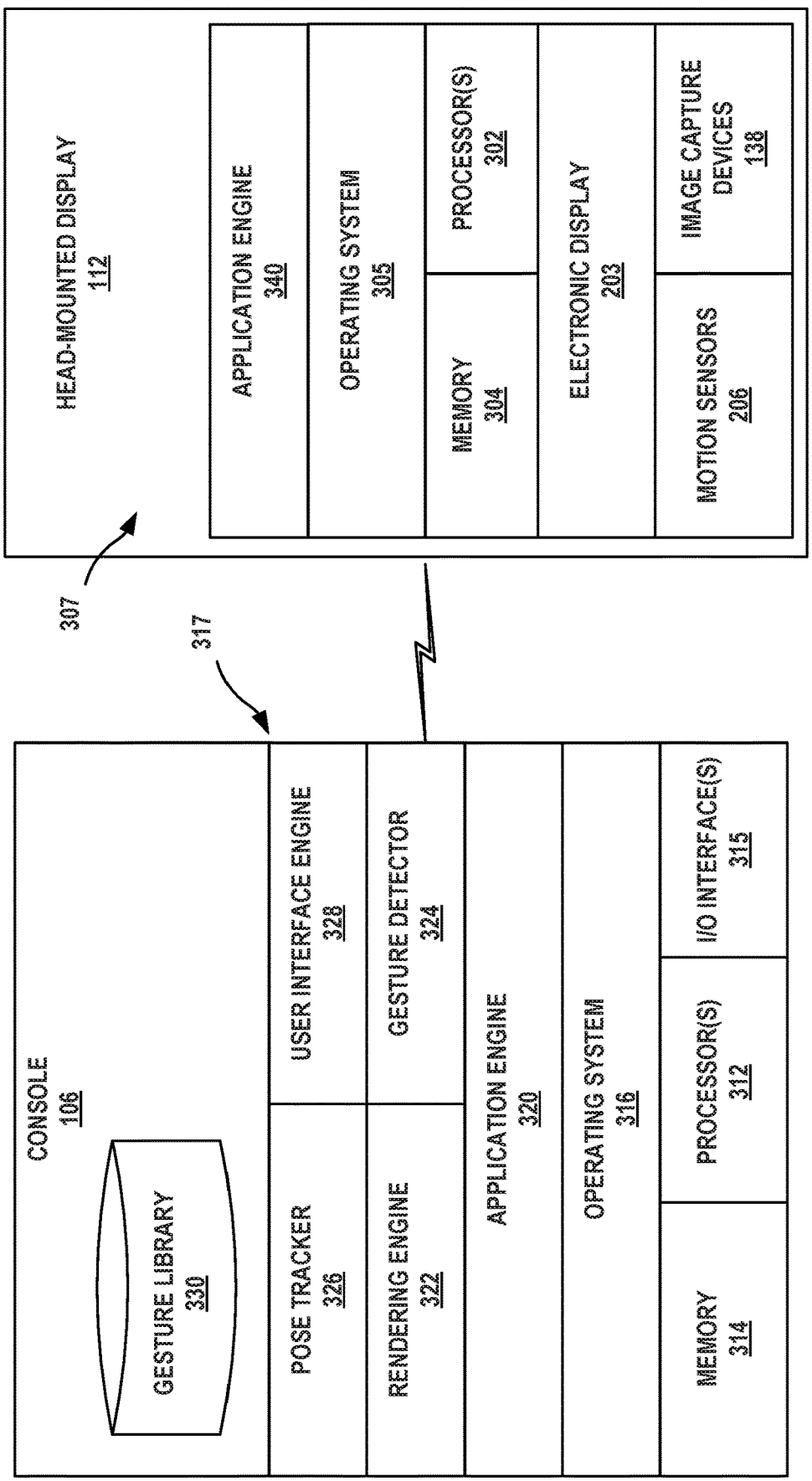
FIG. 3 is a block diagram showing example implementations of a console and an HMD of the artificial reality systems of FIGS. 1A, 1B.

FIG. 3 is a block diagram showing example implementations of console 106 and head mounted display 112 of artificial reality system 10, 20 of FIGS. 1A, 1B. In the example of FIG. 3, console 106 performs pose tracking, gesture detection, and user interface generation and rendering for HMD 112 in accordance with the techniques described herein based on sensed data, such as motion data and image data received from HMD 112 and/or external sensors.

In this example, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 307, including application engine 340. As discussed with respect to the example of FIG. 2, processors 302 are coupled to electronic display 203, motion sensors 206 and image capture devices 138. In some examples, processors 302 and memory 304 may be separate, discrete components. In other examples, memory 304 may be on-chip memory collocated with processors 302 within a single integrated circuit.

In general, console 106 is a computing device that processes image and tracking information received from cameras 102 (FIG. 1B) and/or HMD 112 to perform gesture detection and user interface generation for HMD 112. In some examples, console 106 is a single computing device, such as a workstation, a desktop computer, a laptop, or gaming system. In some examples, at least a portion of console 106, such as processors 312 and/or memory 314, may be distributed across a cloud computing system, a data center, or across a network, such as the Internet, another public or private communications network, for instance, broadband, cellular, Wi-Fi, and/or other types of communication networks for transmitting data between computing systems, servers, and computing devices.

In the example of FIG. 3, console 106 includes one or more processors 312 and memory 314 that, in some examples, provide a computer platform for executing an operating system 316, which may be an embedded, real-time multitasking operating system, for instance, or other type of operating system. In turn, operating system 316 provides a multitasking operating environment for executing one or more software components 317. Processors 312 are coupled to one or more I/O interfaces 315, which provides one or more I/O interfaces for communicating with external devices, such as a keyboard, game controllers, display devices, image capture devices, HMDs, and the like. Moreover, the one or more I/O interfaces 315 may include one or more wired or wireless network interface controllers (NICs) for communicating with a network, such as network 104. Each of processors 302, 312 may comprise any one or more of a multi-core processor, a controller, a digital signal processor (DSP), an application specific integrated circuit (ASIC), a field-programmable gate array (FPGA), processing circuitry (e.g., fixed function circuitry or programmable circuitry or any combination thereof) or equivalent discrete or integrated logic circuitry. Memory 304, 314 may comprise any form of memory for storing data and executable software instructions, such as random-access memory (RAM), read only memory (ROM), programmable read only memory (PROM), erasable programmable read only memory (EPROM), electronically erasable programmable read only memory (EEPROM), and flash memory.

Software applications 317 of console 106 operate to provide an overall artificial reality application. In this example, software applications 317 include application engine 320, rendering engine 322, gesture detector 324, pose tracker 326, and user interface engine 328. In general, application engine 320 includes functionality to provide and present an artificial reality application, e.g., a teleconference application, a gaming application, a navigation application, an educational application, training or simulation applications, and the like. Application engine 320 may include, for example, one or more software packages, software libraries, hardware drivers, and/or Application Program Interfaces (APIs) for implementing an artificial reality application on console 106. Responsive to control by application engine 320, rendering engine 322 generates 3D artificial reality content for display to the user by application engine 340 of HMD 112.

Application engine 320 and rendering engine 322 construct the artificial content for display to user 110 in accordance with current pose information for a frame of reference, typically a viewing perspective of HMD 112, as determined by pose tracker 326. Based on the current viewing perspective, rendering engine 322 constructs the 3D, artificial reality content which may in some cases be overlaid, at least in part, upon the real-world 3D environment of user 110. During this process, pose tracker 326 operates on sensed data received from HMD 112, such as movement information and user commands, and, in some examples, data from any external sensors 90 (FIGS. 1A, 1B), such as external cameras, to capture 3D information within the real-world environment, such as motion by user 110 and/or feature tracking information with respect to user 110. Based on the sensed data, pose tracker 326 determines a current pose for the frame of reference of HMD 112 and, in accordance with the current pose, constructs the artificial reality content for communication, via the one or more I/O interfaces 315, to HMD 112 for display to user 110.

Moreover, based on the sensed data, gesture detector 324 analyzes the tracked motions, configurations, positions, and/or orientations of objects (e.g., hands, arms, wrists, fingers, palms, thumbs) of the user to identify one or more gestures performed by user 110. More specifically, gesture detector 324 analyzes objects recognized within image data captured by image capture devices 138 of HMD 112 and/or sensors 90 and external cameras 102 to identify a hand and/or arm of user 110, and track movements of the hand and/or arm relative to HMD 112 to identify gestures performed by user 110. Gesture detector 324 may track movement, including changes to position and orientation, of the hand, digits, and/or arm based on the captured image data, and compare motion vectors of the objects to one or more entries in gesture library 330 to detect a gesture or combination of gestures performed by user 110. Some entries in gesture library 330 may each define a gesture as a series or pattern of motion, such as a relative path or spatial translations and rotations of a user's hand, specific fingers, thumbs, wrists and/or arms. Some entries in gesture library 330 may each define a gesture as a configuration, position, and/or orientation of the user's hand and/or arms (or portions thereof) at a particular time, or over a period of time. Other examples of type of gestures are possible. In addition, each of the entries in gesture library 330 may specify, for the defined gesture or series of gestures, conditions that are required for the gesture or series of gestures to trigger an action, such as spatial relationships to a current field of view of HMD 112, spatial relationships to the particular region currently being observed by the user, as may be determined by real-time gaze tracking of the individual, types of artificial content being displayed, types of applications being executed, and the like.

Each of the entries in gesture library 330 further may specify, for each of the defined gestures or combinations/series of gestures, a desired response or action to be performed by software applications 317. For example, in accordance with the techniques of this disclosure, certain specialized gestures may be pre-defined such that, in response to detecting one of the pre-defined gestures, user interface engine 328 dynamically generates a user interface as an overlay to artificial reality content being displayed to the user, thereby allowing the user 110 to easily invoke a user interface for configuring HMD 112 and/or console 106 even while interacting with artificial reality content. In other examples, certain gestures may be associated with other actions, such as providing input, selecting objects, launching applications, and the like.

In accordance with some examples of the system configurations and techniques of this disclosure, gesture detector 324 determines whether an identified motion and/or configuration of objects (e.g., hands, arms, wrists, fingers, palms, thumbs) of the user corresponds to a predefined gesture defined by one of a plurality of entries in gesture library 330. Each of the entries of gesture library 330 may define a different gesture as a specific motion, configuration, position, and/or orientation of a user's hand, digit (finger or thumb) and/or arm over time, or a combination of such properties. In addition, each of the defined gestures may be associated with a desired response in the form of one or more actions to be performed by other components of console 106 and/or HMD 112.

As one example, one or more of the predefined gestures in gesture library 330 may trigger the generation, transformation, and/or configuration of one or more user interface elements, by UI engine 328. Rendering engine 322 may render and overlay the UI element(s) that UI engine 328 generates based on gesture detector 324 detecting the predefined gesture(s). In some examples, UI engine 328 and rendering engine 322 may define a location and/or orientation of the UI element (discussed by way of the example of UI menu 124) in artificial reality content 122 communicated to HMD 112.

According to some of the techniques described herein, UI engine 328 and rendering engine 322 perform UI element gating in response to gesture detector 324 identifying one or more gestures in which hand 132 is configured such that two of the digits form approximately a right angle. For example, gesture detector 324 identifies the gating gesture if an index finger and a thumb of hand 132 form approximately a right angle. In some examples, gesture detector 324 adds a temporal component to the criteria for the gating gesture to be recognized. That is, gesture detector 324 may identify the gesture if the configuration of hand 132 is substantially stationary for at least a threshold period of time, and during the period of time during which hand 132 is stationary, and hand 132 is positioned such that the index finger and the thumb of hand 132 form approximately a right angle. It will be appreciated that, while the position of hand 132 is described herein as forming an "angle" as represented by a turn between two straight lines, gesture detector 324 adjusts the angle determination of this disclosure to accommodate human anatomical idiosyncrasies, such as the curvature of the webbing between the thumb and index finger, any natural bends caused by inter-phalange joints of the fingers of hand 132, etc.

In some examples, gesture detector 324 identifies different gating gestures based on the orientation of hand 132 when the index finger and thumb are positioned approximately at the right angle. For example, gesture detector 324 may identify one gating gesture if a back surface of hand 132 is facing image capture devices 138, and may identify a different gating gesture if a palm of hand 132 is facing image capture devices 138. As another example, gesture detector 324 may identify one gating gesture if the thumb of hand 132 is facing upwards in the view captured by image capture devices 138, and may identify a different gating gesture if the index finger of hand 132 is facing upwards in the view captured by image capture devices 138. In some examples, artificial reality system 10 may recognize the particular gestures based on a combination of the various orientation attributes of hand 132 described above.

In these examples, UI engine 328 may generate the UI element such that the approximate apex of the angle formed between the index finger and the thumb generally indicates the location of a corner of the UI element. In one example, assuming that hand 132 is the right hand of user 110, UI engine 328 may generate the UI element such that the apex of the angle between the index finger and thumb of hand 132 indicates the location of the bottom right corner of the UI element. Conversely, in one example, assuming that hand 132 is the left hand of user 110, UI engine 328 may generate the UI element such that the apex of the angle between the index finger and thumb of hand 132 indicates the location of the bottom left corner of the UI element.

Additionally, UI engine 328 may edit one or more of the orientation, the granularity, the content, etc. of the UI element if gesture detector 324 detects a change in the orientation of hand 132 while the index finger and thumb form the approximate right angle. For example, UI engine 328 may gate the UI element as a menu in portrait orientation if gesture detector 324 detects that the index finger of hand 132 is pointing upward and the back of hand 132 is facing image capture devices 138. In this example, UI engine 328 may switch the menu to have a landscape orientation if gesture detector 324 detects that the orientation of hand 132 has changed such that the thumb of hand 132 is facing upward and the palm of hand 132 is facing image capture devices 138.

In some such examples, UI engine 328 may also change the contents of the menu based on the change in the orientation of hand 132 as identified by gesture detector 324. For example, UI engine 328 may edit the menu to include user-selectable options that provide a finer-grained set of user-selectable options in the landscape-oriented menu in comparison to the portrait-oriented menu. For instance, UI engine 328 may generate the landscape-oriented menu as a drilldown menu that shows a deeper level of user-selectable options than the portrait-oriented menu. In some examples, UI engine 328 may be configured to gate the UI element by identifying a top right or top left corner of the UI element if gesture detector 324 detects a configuration of hand 132 that is inverted in comparison to the 'L' or mirror-image 'L' configurations described above.

According to some techniques of this disclosure, gesture detector 324 detects a gating gesture if hand 132 is positioned substantially stationary for at least the threshold period of time, and the digits of hand 132 are positioned such that such that the thumb and at least one other finger of hand 132 form approximately a circle or approximately a circular segment. In some examples, gesture detector 324 may detect the gesture if the view of hand 132 facing image capture devices 138 is a sideways orientation, and represents the side of hand 132 on which the thumb is located. For instance, the normal drawn from image capture devices 138 to hand 132 may intersect with the inside area of the circle or circular segment formed by the thumb and the other finger(s) of hand 132. In some of these implementations, UI engine 328 may position moving pictures to play a video within the circle or circular segment formed by hand 132, thereby creating the effect of a "video passthrough" within the overall virtual environment represented by artificial reality content 122. In other implementations, UI engine 328 may display a UI element, such as a menu of user-selectable options within or at a location generally corresponding to the circle or circular segment formed by hand 132. Rendering engine 322 is configured to render artificial reality content 122 for output via electronic display 203, both with and without the various UI elements generated by UI engine 328 in response to the gestures detected by gesture detector 324.

According to some techniques of this disclosure, gesture detector 324 detects a gating gesture if a portion of arm 134 is positioned substantially stationary for at least the threshold period of time, and is in the FoV of HMD 112 for at least the threshold period of time. For example, gesture detector 324 may detect the gesture if the configuration of arm 134 is such that the wrist is substantially stationary for at least a threshold period of time, and the wrist is positioned such that a normal from the wrist faces HMD 112. In some examples, gesture detector 324 may detect the gesture if the view of arm 134 facing HMD 112 is a sideways orientation, and represents the inner side of the wrist, i.e. the side on which the thumb of hand 132 is located. For instance, the normal drawn from HMD 112 to arm 134 may intersect with the inside surface of the wrist. In some of these implementations, UI engine 328 may generate a UI element, such as a menu, which rendering engine 322 renders as being superimposed on a representation of the wrist within the virtual environment represented by artificial reality content 122.

According to some techniques of this disclosure, UI engine 328 includes a display element within artificial reality content 122, enabling gesture detector 324 to identify gestures performed with respect to the display element. In these examples, gesture detector 324 may detect certain predefined gestures performed at locations generally corresponding to the location of the display element within the virtual environment, and UI engine 324 may gate UI elements in response to gesture detector 324 detecting one or more of these predefined gestures at the location corresponding to the location of the display element. As such, the display element may be considered an "assistant" or "personal assistant" that travels with an avatar representing user 110 within the virtual environment represented by artificial reality content 122. According to various aspects of this disclosure UI engine 328 may cause rendering engine 322 to render the assistant element as being attached to the virtual body of the avatar, or as being detached from and following the avatar.

In some examples, rendering engine 322 may generate the assistant element to appear detached from the avatar, and to follow the avatar's movements within the virtual environment represented by artificial reality content 122. According to these examples, the assistant element simulates a drone that hovers above or floats alongside the avatar of user 110 in the virtual environment represented by artificial reality content 122. In these implementations, gesture detector 324 may detect the gating gesture based on a grip-and-throw combination performed by hand 132 with respect to the assistant element included in artificial reality content 122.

For example, gesture detector 324 may identify the gating gesture contingent on detecting a combination of (1) a gripping motion of two or more digits of hand 132 to form a gripping configuration at a location that corresponds to the assistant element within the virtual environment represented by artificial reality content 122, and (ii) a throwing motion of hand 132 with respect to the assistant element, where the throwing motion occurs subsequently to the gripping motion.

For instance, artificial reality system 10 may detect the throwing motion by identifying a combination of a release of the gripping configuration of hand 132 and a particular movement of hand 132 and/or arm 134. The particular movement that accompanies, follows, or partially overlaps with the release of the gripping configuration may include a flexion of the wrist of arm 134 and/or of joints of hand 132, an outward flicking motion of at least one of the digits of hand 132, or various permutations/combination thereof.

In some examples, rendering engine 322 may render the assistant element as being attached to a wrist of the avatar. For instance, rendering engine 322 may render the assistant element as being attached to the wrist of a non-dominant arm, such as the left arm in a scenario in which arm 134 represents dominant right arm of user 110. In these examples, the assistant element may simulate a wearable item, in that the assistant element is rendered as being presently attached to, but potentially detachable from, the other arm of user 110. For instance, rendering engine 322 may render the display element at a location corresponding to a representation of user 110's other arm (i.e., the arm other arm 134), which may, in some examples represent the non-dominant arm of user 110. In some such implementations, gesture detector 324 may detect a gesture that includes a grip-and-move combination, a grip-and-release combination, a grip-move-release combination, or simply a grip performed by hand 132 with respect to the assistant element that appears superimposed on and attached to the other arm of user 110.

For example, gesture detector 324 may detect the gesture by identifying a gripping motion of hand 132 with respect to the display element, and in response, UI engine 328 and rendering engine 322 may update the appearance of the display element to appear detached from and separate from the other arm of user 110. In some examples, gesture detector 324 may detect a release of the gripping configuration of hand 132 at a location that is some distance away from the other arm of user 110, i.e. the arm from which the assistant element was removed, as represented in the virtual environment. In turn, UI engine 328 may cause rendering engine 322 to display the assistant element at approximately the location where the gripping configuration of hand 132 was released. In this example, gesture detector 324 leverages a single-handed gesture, thereby alleviating user burdens associated with double-handed gestures.

Additionally, based on gesture detector 324 identifying the release of the gripping configuration of hand 132, UI engine 328 may gate a UI element, such as a menu of user-selectable options. For example, UI engine 328 may cause rendering engine 322 to render the menu such that the menu is positioned next to or otherwise in the general vicinity of the assistant element, while the assistant element appears suspended at the location where the gripping configuration of hand 132 was released. In some examples, gesture detector 324 may subsequently detect a grip-and-move gesture of hand 132 with respect to the assistant element, such that the display element is moved back to the wrist of the other arm of user 110. In these examples, UI engine 328 may remove the menu from artificial reality content 122, thereby causing rendering engine 322 to cease rendering the menu within the virtual environment.

In some implementations, gesture detector 324 may detect a grip-and-pull combination or a pinch-and-pull combination with respect to the display element that originates at a predefined area of the other arm of user 110, such as at the wrist of the other arm. According to these implementations, UI engine 328 may gate a UI menu of user-selectable options, in response to gesture detector 324 identifying any of these movements. According to some of these implementations, UI engine 328 and rendering engine 322 may change the content, form factor, or selection granularity of the menu in response to gesture detector 324 detecting different lengths of pulling from the other arm's wrist.

For instance, UI engine 328 and rendering engine 322 of artificial reality system 10 may gate the UI menu by modifying the UI element, in response to identifying a grip-and-pull combination motion of hand 132 with respect to the UI element (e.g., an example of the assistant described above) virtually overlaid on the wrist. If gesture detector 324 identifies a gripping motion of two or more digits of hand 132 to form a gripping configuration, and a subsequent pulling motion of the same two or more digits away from the wrist of the other hand, while the same two or more digits are in the gripping configuration, then UI engine 328 may cause rendering engine 322 to output a menu, such as a circular menu.

In this way, these particular aspects of this disclosure described above simulate a drawer or filing cabinet in terms of invoking UI elements. If gesture detector 324 identifies a stoppage in the pulling motion while the gripping configuration is still intact, followed by a further pulling motion with the gripping configuration still intact, then UI engine 328 may make updates to the menu, and cause rendering engine 122 to output the updated menu via artificial reality content 122. In some examples, rendering engine 322 may position the original menu and the updated menu at different locations, such as at the locations where the corresponding pulling motion ceased.

Accordingly, the techniques and system configurations of this disclosure provide specific technical improvements to the computer-related field of rendering and displaying content by an artificial reality system. For example, the artificial reality system of FIG. 3 may provide a high-quality artificial reality experience to a user, such as user 110, by generating and rendering user interface elements overlaid on the artificial reality content based on detection of intuitive, yet distinctive, gestures performed by the user.

Further, systems as described herein may be configured to detect certain gestures based on hand and arm movements that are defined to avoid tracking occlusion. Tracking occlusion may occur when one hand of the user at least partially overlaps the other hand, making it difficult to accurately track the individual digits (fingers and thumb) on each hand, as well as the position and orientation of each hand. Systems as described herein, therefore, may be configured to primarily detect single-handed or single arm-based gestures. The use of single-handed or single arm-based gestures may further provide enhanced accessibility to users having large- and fine-motor skill limitations. Furthermore, systems as described herein may be configured to detect double-handed or double arm-based gestures in which the hands of the user do not interact or overlap with each other.

Figure 4:
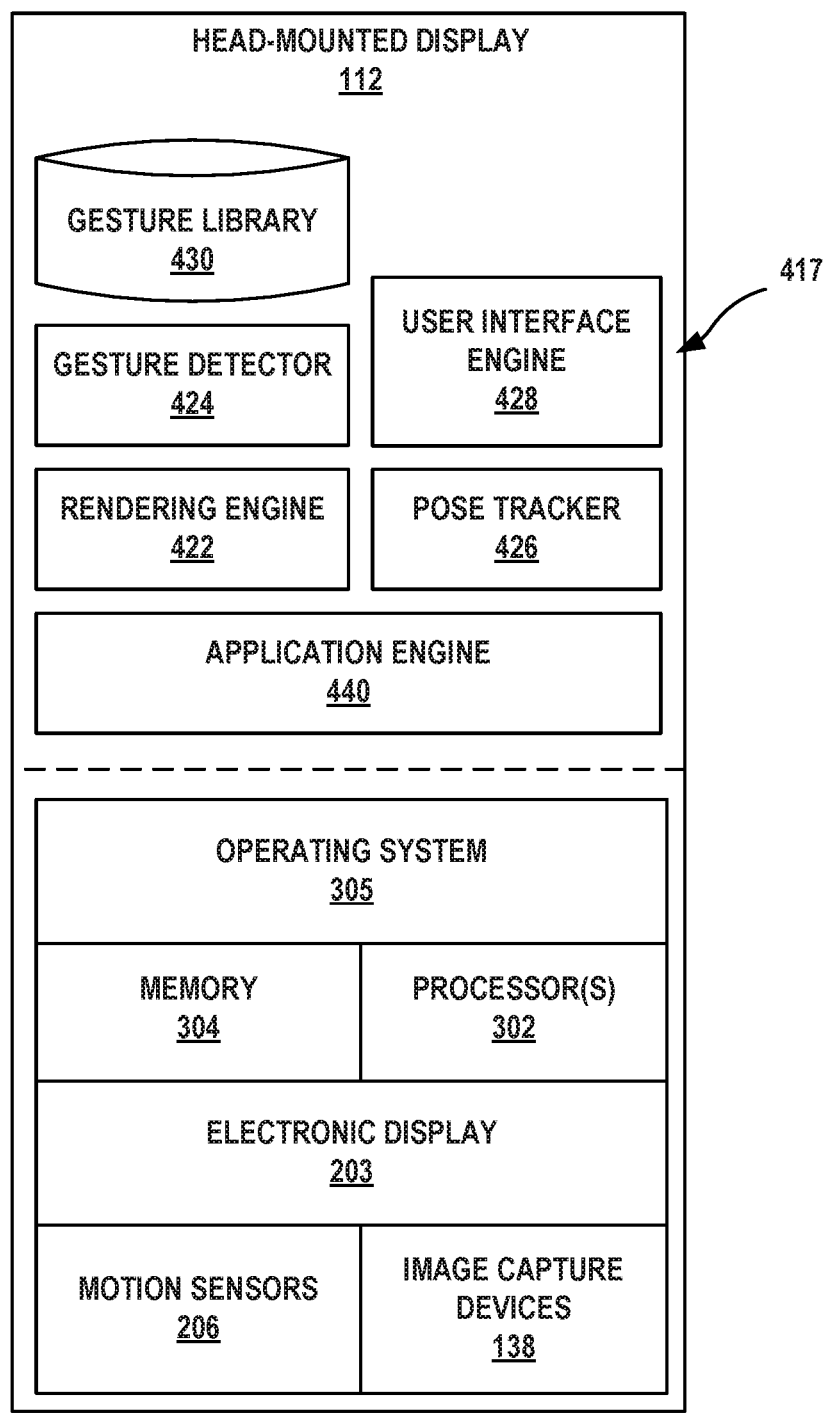
FIG. 4 is a block diagram depicting an example in which gesture detection and user interface generation is performed by the HMD of the artificial reality systems of FIGS. 1A, 1B in accordance with the techniques of the disclosure.

FIG. 4 is a block diagram depicting an example in which gesture detection and user interface generation is performed by HMD 112 of the artificial reality systems of FIGS. 1A, 1B in accordance with the techniques of the disclosure.

In this example, similar to FIG. 3, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 417. Moreover, processor(s) 302 are coupled to electronic display 203, motion sensors 206, and image capture devices 138.

In the example of FIG. 4, software components 417 operate to provide an overall artificial reality application. In this example, software applications 417 include application engine 440, rendering engine 422, gesture detector 424, pose tracker 426, and user interface engine 428. In various examples, software components 417 operate similar to the counterpart components of console 106 of FIG. 3 (e.g., application engine 320, rendering engine 322, gesture detector 324, pose tracker 326, and user interface engine 328) to construct user interface elements overlaid on, or as part of, the artificial content for display to user 110 in accordance with detected gestures of user 110. In some examples, rendering engine 422 constructs the 3D, artificial reality content which may be overlaid, at least in part, upon the real-world, physical environment of user 110.

Similar to the examples described with respect to FIG. 3, based on the sensed data, gesture detector 424 analyzes the tracked motions, configurations, positions, and/or orientations of objects (e.g., hands, arms, wrists, fingers, palms, thumbs) of the user to identify one or more gestures performed by user 110. In accordance with the techniques of the disclosure, user interface engine 428 generates user interface elements as part of, e.g., overlaid upon, the artificial reality content to be displayed to user 110 and/or performs actions based on one or more gestures or combinations of gestures of user 110 detected by gesture detector 424. More specifically, gesture detector 424 analyzes objects recognized within image data captured by image capture devices 138 of HMD 112 and/or sensors 90 or external cameras 102 to identify a hand and/or arm of user 110, and track movements of the hand and/or arm relative to HMD 112 to identify gestures performed by user 110. Gesture detector 424 may track movement, including changes to position and orientation, of the hand, digits, and/or arm based on the captured image data, and compare motion vectors of the objects to one or more entries in gesture library 430 to detect a gesture or combination of gestures performed by user 110.

Gesture library 430 is similar to gesture library 330 of FIG. 3. Each of the entries in gesture library 430 may specify, for the defined gesture or series of gestures, conditions that are required for the gesture to trigger an action, such as spatial relationships to a current field of view of HMD 112, spatial relationships to the particular region currently being observed by the user, as may be determined by real-time gaze tracking of the individual, types of artificial content being displayed, types of applications being executed, and the like.

In response to detecting a matching gesture or combination of gestures, HMD 112 performs the response or action assigned to the matching entry in gesture library 430. For example, in accordance with the techniques of this disclosure, certain specialized gestures may be pre-defined such that, in response to gesture detector 424 detecting one of the pre-defined gestures, user interface engine 428 dynamically generates a user interface as an overlay to artificial reality content being displayed to the user, thereby allowing the user 110 to easily invoke a user interface for configuring HMD 112 while viewing artificial reality content. In other examples, in response to gesture detector 424 detecting one of the pre-defined gestures, user interface engine 428 and/or application engine 440 may receive input, select values or parameters associated with user interface elements, launch applications, modify configurable settings, send messages, start or stop processes or perform other actions.

Various gestures that gesture detector 424 may identify from the image data captured by image capture devices 138 include 'L' shaped configurations of hand 132, grip- and pull movements performed by hand 132, and grip-and-throw movements performed by hand 132. Another example of a gesture that gesture detector 424 may identify from the image data is a wrist-gazing gesture, in which the wrist of the opposite arm of user 110 is placed in the FoV of HMD 112 for at least a threshold period of time, and is substantially stationary for at least the threshold period of time. UI engine 428 and rendering engine 422 may gate various UI elements, such as menus of user-selectable options, in response to gesture detector 424 identifying any of the predefined gestures of this disclosure. In some examples, UI engine 428 and rendering engine 422 may remove a previously-gated UI element in response to gesture detector 424 identifying a subsequent "de-gating" gesture from the image data.

Figure 5:
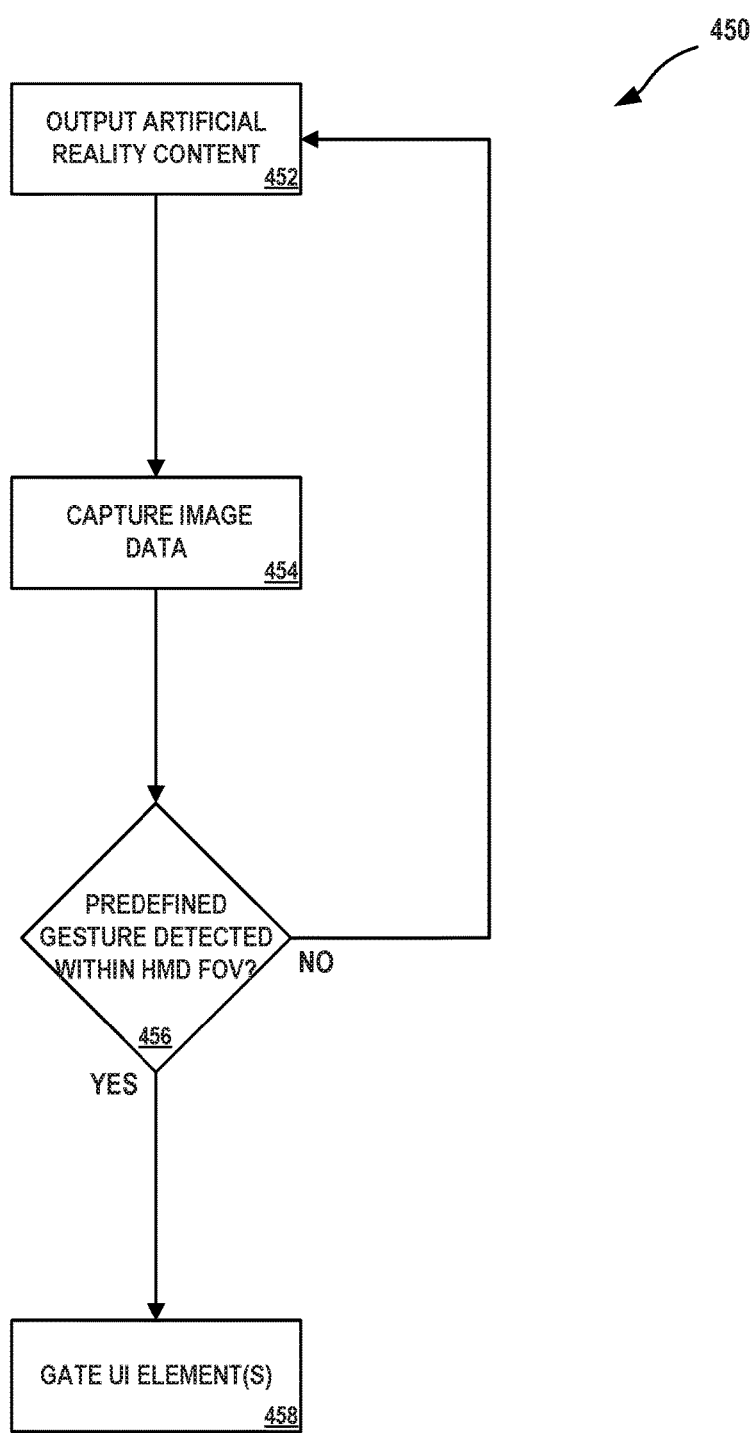
FIG. 5 is a flowchart illustrating a process that artificial reality systems of this disclosure may perform in accordance with the gesture-driven UI element gating techniques of this disclosure.

FIG. 5 is a flowchart illustrating a process 450 that artificial reality systems 10, 20 and/or components thereof may perform in accordance with the gesture-driven UI element gating techniques of this disclosure. While FIG. 5 illustrates various steps in particular order/sequence as an example, it will be appreciated that artificial reality systems 10, 20 may perform the illustrated steps in various orders/sequences, including partial or total concurrencies, and may iterate various steps a number of times. UI engines 328, 428 and rendering engines 322, 422 may output artificial reality content 122 (452). For example, UI engines 328, 428 and rendering engines 322, 422 may output artificial reality content 122 via electronic display 203 to generate a virtual environment.

Image capture devices 138 and/or external cameras 102 may capture image data (454). The image data may reflect the physical environment surrounding user 110. Gesture detectors 324, 424 may determine whether a predefined gesture is detected within the FoV of HMD 112 (decision block 456). For instance, gesture detectors 324, 424 may process the image data received from image capture devices 138 and/or external cameras 102 to determine whether one or more of the hand/arm configurations and/or motions/movements detected from the image data match an entry of gesture libraries 330, 430.

If gesture detectors 324, 424 do not identify a predefined gesture from the image data (NO branch of decision block 456), artificial reality systems 10, 20 may continue to output artificial reality content 122 and capture image data from the physical environment of user 110 (effectively iterating steps 452 and 454). If gesture detectors 324, 424 identify a predefined gesture from the image data (YES branch of decision block 456), then UI engines 328, 428 and rendering engines 322, 422 may gate one or more UI elements (458) in accordance with the gesture-driven UI element gating techniques of this disclosure. Various examples of predefined gestures and UI elements that can be gated in accordance with the techniques of this disclosure are described below in further detail.

FIGS. 6A-11 are conceptual diagrams illustrating various movements and configurations of hand 132 (and in some cases, the wrist of arm 134) that gesture detectors 324, 424 may use to identify various predefined gating gestures according to aspects of this disclosure. The wrist of arm 134 is labeled as wrist 135 in some of FIGS. 5A-10, the other arm of user 110 is labeled as opposite arm 934, and the wrist of the other arm is labeled as opposite wrist 902.

Figure 6A:
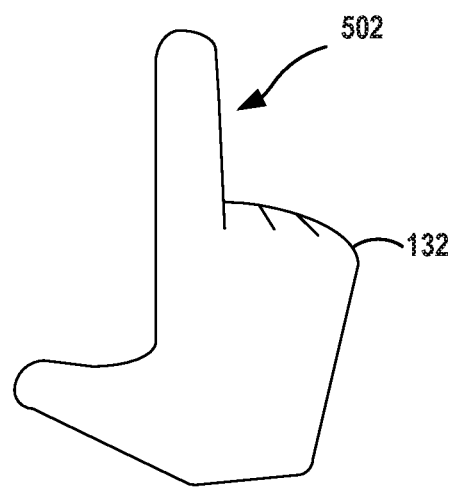
FIGS. 6A-6D illustrate corner-based gating configurations of a hand and UI elements that artificial reality systems of this disclosure may invoke in response to the identification of the corner-based gating configurations of hand.

FIGS. 6A-6D illustrate corner-based gating configurations of hand 132 and UI elements that artificial reality systems 10, 20 may invoke in response to the identification of the corner-based gating configurations of hand 132. FIG. 6A illustrates configuration 502 of hand 132 that gesture detectors 324, 424 may identify, in response to which UI engines 328, 428 may gate a UI element based on configuration 502 identifying the approximate location of a corner of the UI element. As shown in FIG. 6A, configuration 502 entails an approximate right angle between the index finger and thumb of hand 132. That is, image capture devices 138 and/or external cameras 102 may capture image data representative of a physical environment of user 110, and electronic display 203 may output artificial reality content. Gesture detectors 328, 428 may identify, from the image data, a gesture comprising configuration 502 in which hand 132 is substantially stationary for at least a threshold period of time and positioned such that an index finger and a thumb of hand 132 form approximately a right angle. UI engines may generate a UI element in response to the identified gesture, and rendering engines 322, 422 may render the UI element as an overlay to the artificial reality content. In the case of configuration 502, the index finger of hand 132 points upward in the field of view (FoV) of HMD 112, and the back of hand 132 faces image capture devices 138. Based on gesture detectors 322, 422 detecting hand 132 being in configuration 502 for at least the threshold period of time, UI engines 328, 428 may cause rendering engines 322, 422 to render the UI element according to a portrait orientation.

Figure 6B:
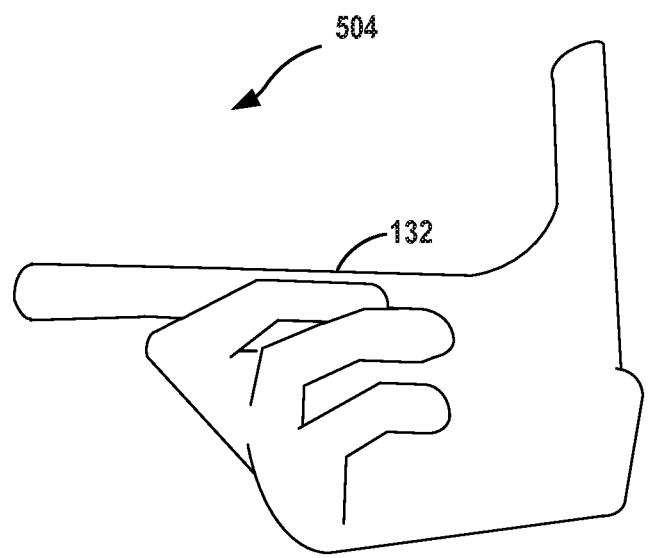

FIG. 6B illustrates another configuration 504 of hand 132 that gesture detectors 324, 424 may identify, in response to which UI engines 328, 428 may gate a UI element based on configuration 504 identifying the approximate location of a corner of the UI element. In the case of configuration 504, the thumb of hand 132 points upward in the view captured by image capture devices 138, and the palm of hand 132 faces HMD 112. Based on gesture detectors 322, 422 detecting hand 132 being in configuration 504 for at least the threshold period of time, UI engines 328, 428 may cause rendering engines 322, 422 to render the UI element according to a landscape orientation. Configuration 504 represents a 90-degree hand rotation and a 180-degree hand reflection with respect to configuration 502.

Figure 6C:
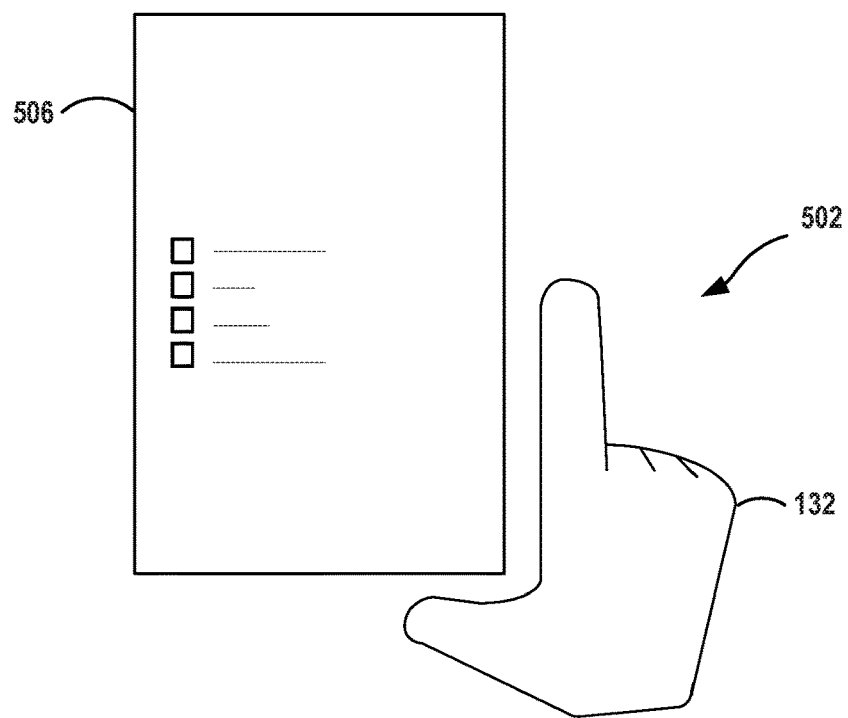

FIG. 6C illustrates menu 506 that UI engines 328, 428 and rendering engines 322, 422 may gate in response to gesture detectors 324, 424 identifying a gesture in which hand 132 conforms to configuration 502 for at least the threshold period of time. As shown in FIG. 6C, UI engines 328, 428 and rendering engines 322, 422 gate menu 506 according to a portrait orientation, in response to gesture detectors 324, 424 determining that hand 132 conforms to configuration 502 for at least the threshold period of time.

Figure 6D:
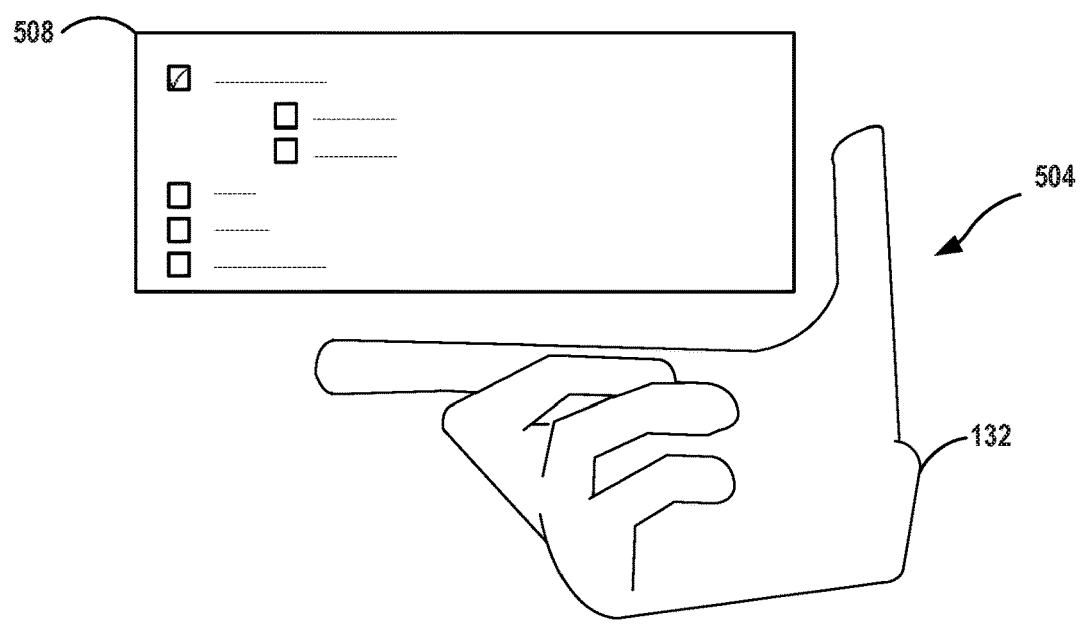

FIG. 6D illustrates menu 508 that that UI engines 328, 428 and rendering engines 322, 422 may gate in response to gesture detectors 324, 424 identifying a gesture in which hand 132 conforms to configuration 504 for at least the threshold period of time. As shown in FIG. 6D, UI engines 328, 428 and rendering engines 322, 422 gate menu 508 according to a landscape orientation, in response to gesture detectors 324, 424 determining that hand 132 conforms to configuration 504 for at least the threshold period of time.

In some use case scenarios, gesture detectors 324, 424 may detect a transition of hand 132 from configuration 502 to configuration 504 as the performance of two separate, sequential gestures. As such, gesture detectors 324, 424 may identify two separate gestures based on the position of hand 132 conforming to configuration 502 and the position of hand conforming to configuration 504. In this particular use case scenario, gesture detectors 324, 424 identify the first gesture based on the first position (conforming to configuration 502) being detected prior to the second gesture based on the second position (conforming to configuration 504) being detected. In this case, UI engines 328, 428 and rendering engines 322, 422 may modify menu 506, which conforms to a first (portrait) orientation to form menu 508, which conforms to a second (landscape) orientation. In the examples illustrated in FIGS. 6C and 6D, menu 506 (conforming to the first, i.e. portrait, orientation) includes a subset of user-selectable options included in menu 508 (conforming to the second, i.e. landscape, orientation).

In the particular examples of FIGS. 6C and 6D, UI engines 328, 428 interpret the data provided by gesture detectors 324, 424 to determine that each of the gestures in which hand 132 conforms to configurations 502, 504 indicates the location of the lower-right corner of menus 506, 508, respectively. However, it will be appreciated that, in other examples, UI engines 328, 428 and rendering engines 322, 422 may identify the lower-left, upper-left, or upper-right corners of various UI elements based on the information provided by gesture detectors 324, 424. In each of FIGS. 6C and 6D, UI engines 328, 428 and rendering engines 322, 422 render menus 506 and 508 such that the long side of the respective menu 506, 508 substantially aligns with the index finger of hand 132.

Figure 7A:
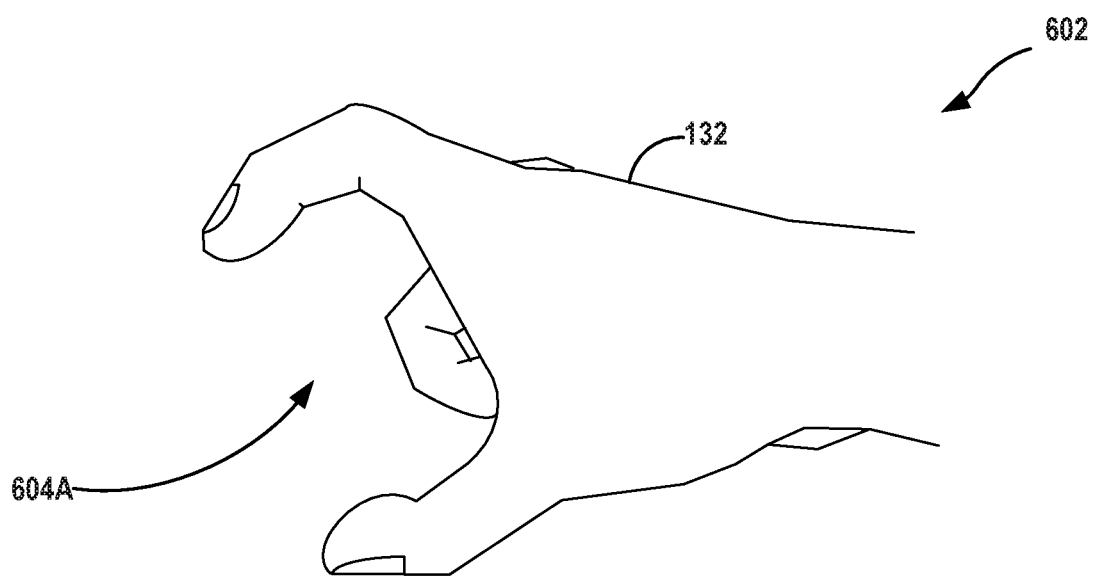
FIGS. 7A and 7B illustrate rounded-boundary configurations of a hand that artificial reality systems of this disclosure may detect as stimuli for gating certain UI elements within a virtual environment represented by artificial reality content.
Figure 7B:
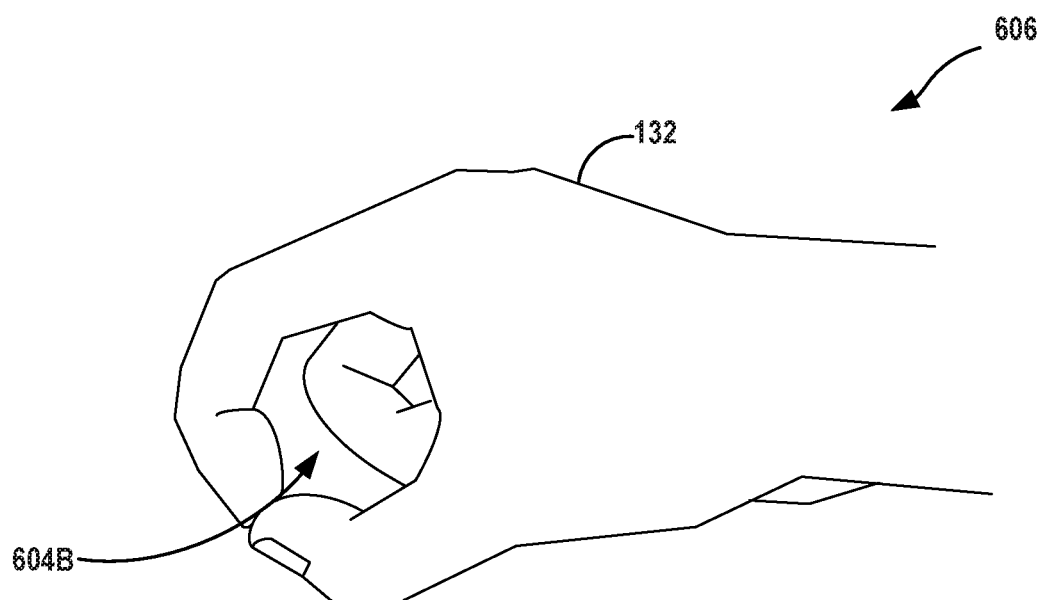

FIGS. 7A and 7B illustrate rounded-boundary configurations of hand 132 that artificial reality systems 10, 20 may detect as stimuli for gating certain UI elements within the virtual environment represented by artificial reality content 122. FIG. 7A illustrates configuration 602, in which the index finger and thumb of hand 132 form a circular segment or approximately a circular segment. The circular segment of configuration 602 generally represents an arc that, if extended from both open ends, would potentially form an enclosed space, such as a circle or approximately a circle. Gesture detectors 324, 424 may identify the gating gesture illustrated in FIG. 7A if hand 132 conforms to configuration 602 and remains in configuration 602 for at least a threshold period of time. That is, gesture detectors 324, 424 identify the gating gesture of FIG. 7A if the positioning of hand 132 satisfies both of the conditions of remaining substantially stationary for at least the threshold period of time, and two of the digits of hand 132 are positioned such that the two digits form the circular segment of configuration 602.

To aid in the user experience and based on the general structure of the human hand, gesture detectors 324, 424 may detect the gating gesture if the thumb of hand 132 forms the circular segment in combination with at least one other finger (other than the thumb) during the threshold period of time. The examples of this disclosure are directed to the index finger and thumb of hand 132 forming the circular segment. However, it will be appreciated that gesture detectors 324, 424 may identify the gating gesture based on the thumb forming the circular segment with various fingers, such as just the index finger, with all four other fingers by way of the index finger occluding the remaining fingers, or with any one or more of the remaining fingers other than the thumb and index finger.

The circular segment formed by hand 132 in accordance with configuration 602 includes enclosed area 604A. In some examples, gesture detectors 324, 424 may identify the gating gesture if hand 132 is positioned such that a normal from anywhere in enclosed area 604A within the circular segment of configuration 602 is facing HMD 112. In these examples, UI engines 328, 428 generate a UI element in response to gesture detectors 324, 424 identifying the gating gesture illustrated in FIG. 7A, and may cause rendering engines 322, 422 to render the UI element as an overlay with respect to a portion of the virtual environment represented by artificial reality content 122.

For example, rendering engines 322, 422 may render the UI element (e.g., content) generated by UI engines 328, 428 to appear within enclosed area 604A or at least partially within enclosed area 604A. In some examples, UI engines 328, 428 generate the UI element to include a reproduction of a portion of the image data representative of the physical environment captured by image capture devices 138 and/or external cameras 102. In these examples, artificial reality systems 10, 20 implement the techniques of this disclosure to provide a "passthrough" effect by reproducing the actual physical environment of user 110 within the circular segment, while maintaining the remainder of the virtual environment represented by artificial reality content 122. In one example, UI engines 328, 428 and rendering engines 322, 422 generate and render the portion of the image data included in the UI element such that the image data corresponds to a portion of the physical environment that lies along the normal from enclosed area 604A within the circular segment facing HMD 112.

In other examples, UI engines 328, 428 generate the UI element to include video data, such as moving pictures. In these examples, artificial reality systems 10, 20 implement the techniques of this disclosure to provide a video "passthrough" effect or video "overlay" effect by playing the video within the circular segment, while maintaining the remainder of the virtual environment represented by artificial reality content 122. In other examples still, UI engines 328, 428 generate the UI element to include a menu of user-selectable options. In these examples, artificial reality systems 10, 20 implement the techniques of this disclosure to provide menu invocation functionalities within the circular segment, while maintaining the remainder of the virtual environment represented by artificial reality content 122. In these examples, UI engines 328, 428 and rendering engines 322, 422 output content that is contained within a virtual window. Either a full boundary or a partial boundary of the virtual window is indicated by the inner ring formed by hand 132.

FIG. 7B illustrates configuration 606, in which the index finger and thumb of hand 132 form a circle or approximately a circle. The circle or approximate circle of configuration 606 generally represents a closed shape that has a generally rounded boundary, after accounting for non-smooth transitions caused by anatomical attributes of hand 132. Gesture detectors 324, 424 may identify the gating gesture illustrated in FIG. 7B if hand 132 conforms to configuration 606 and remains in configuration 606 for at least a threshold period of time. That is, gesture detectors 324, 424 identify the gating gesture of FIG. 7B if the positioning of hand 132 satisfies both of the conditions of remaining substantially stationary for at least the threshold period of time, and two of the digits of hand 132 are positioned such that the two digits form the circle of configuration 606.

To aid in the user experience and based on the general structure of the human hand, gesture detectors 324, 424 may detect the gating gesture if the thumb of hand 132 forms the circle in combination with at least one other finger (other than the thumb) during the threshold period of time. The examples of this disclosure are directed to the index finger and thumb of hand 132 forming the circle. However, it will be appreciated that gesture detectors 324, 424 may identify the gating gesture based on the thumb forming the circle with various fingers, such as just the index finger, with all four other fingers by way of the index finger occluding the remaining fingers, or with any one or more of the remaining fingers other than the thumb and index finger.

The circle formed by hand 132 in accordance with configuration 606 includes enclosed area 604B. In some examples, gesture detectors 324, 424 may identify the gating gesture if hand 132 is positioned such that a normal from anywhere in enclosed area 604B within the circle of configuration 606 is facing HMD 112. In these examples, UI engines 328, 428 generate a UI element in response to gesture detectors 324, 424 identifying the gating gesture illustrated in FIG. 7B, and may cause rendering engines 322, 422 to render the UI element as an overlay with respect to a portion of the virtual environment represented by artificial reality content 122.

For example, rendering engines 322, 422 may render the UI element (e.g., content) generated by UI engines 328, 428 to appear within enclosed area 604B or at least partially within enclosed area 604B. In some examples, UI engines 328, 428 generate the UI element to include a reproduction of a portion of the image data representative of the physical environment captured by image capture devices 138 and/or external cameras 102. In these examples, artificial reality systems 10, 20 implement the techniques of this disclosure to provide a "passthrough" effect by reproducing the actual physical environment of user 110 within the circle, while maintaining the remainder of the virtual environment represented by artificial reality content 122. In one example, UI engines 328, 428 and rendering engines 322, 422 generate and render the portion of the image data included in the UI element such that the image data corresponds to a portion of the physical environment that lies along the normal from enclosed area 604B within the circle facing HMD 112.

In other examples, UI engines 328, 428 generate the UI element to include video data, such as moving pictures. In these examples, artificial reality systems 10, 20 implement the techniques of this disclosure to provide a video "passthrough" effect or video "overlay" effect by playing the video within the circle, while maintaining the remainder of the virtual environment represented by artificial reality content 122. In other examples still, UI engines 328, 428 generate the UI element to include a menu of user-selectable options. In these examples, artificial reality systems 10, 20 implement the techniques of this disclosure to provide menu invocation functionalities within the circle, while maintaining the remainder of the virtual environment represented by artificial reality content 122. In these examples, UI engines 328, 428 and rendering engines 322, 422 output content that is contained within a virtual window. Either a full boundary or a partial boundary of the virtual window is indicated by the inner ring formed by hand 132.

Figure 8A:
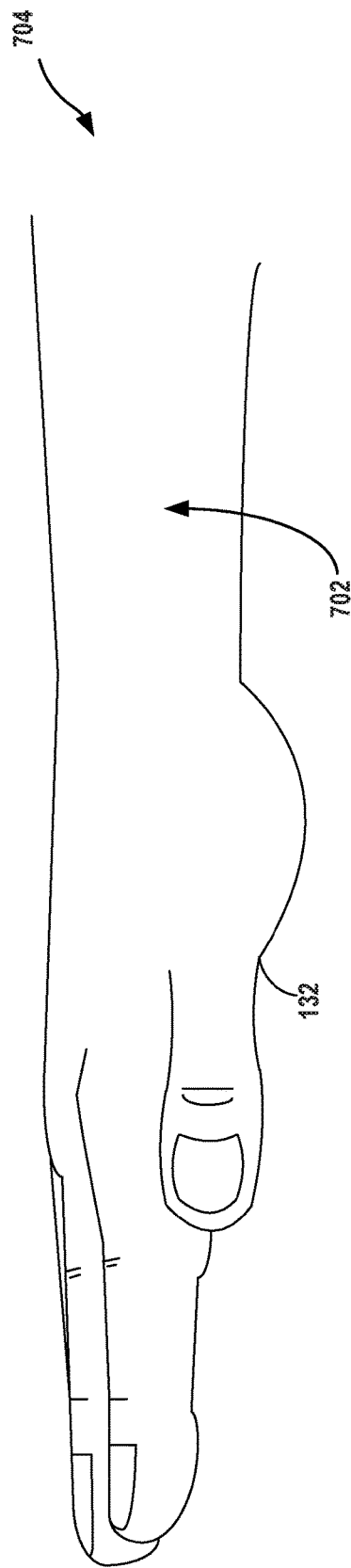
FIGS. 8A and 8B illustrate configurations of an arm that artificial reality systems of this disclosure may detect as stimuli for gating certain UI elements within a virtual environment represented by artificial reality content.
Figure 8B:
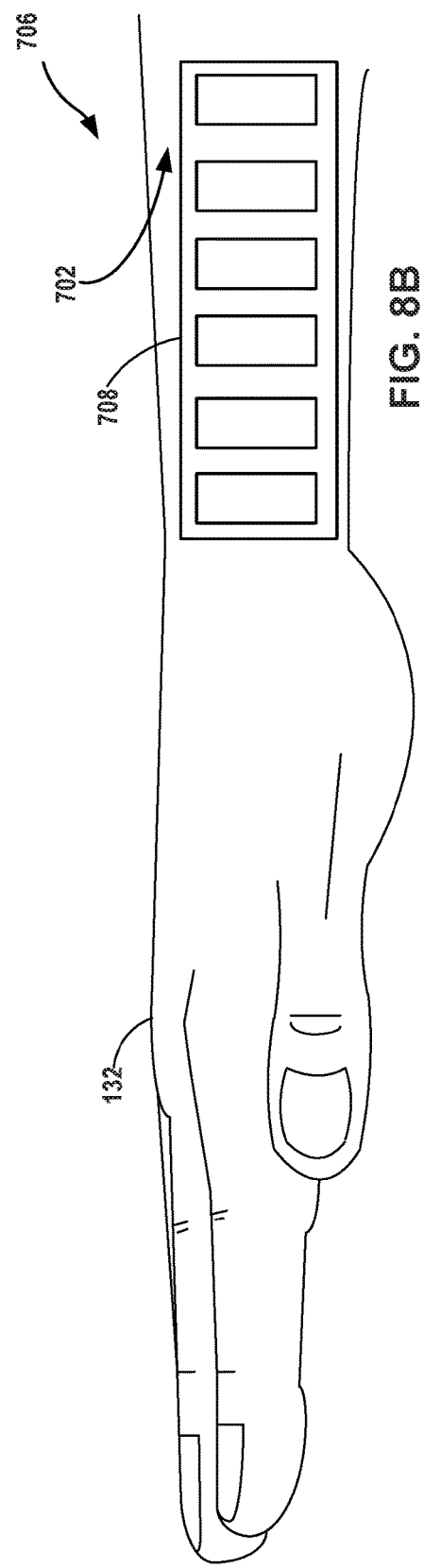

FIGS. 8A and 8B illustrate configurations of arm 134 that artificial reality systems 10, 20 may detect as stimuli for gating certain UI elements within the virtual environment represented by artificial reality content 122. FIGS. 8A and 8B illustrate wrist 702, which is a segment or section of arm 134 that is immediately adjacent to hand 132. Gesture detectors 324, 424 may identify the gating gesture based on the configuration of arm 134 such that wrist 702 being substantially stationary for at least a threshold period of time and positioned such that a normal from wrist 702 is facing HMD 112. For instance, the normal may represent a straight line drawn from any point of wrist 702 to the front rigid body of HMD 112. As such, FIG. 8A illustrates configuration 704 in which wrist 702 is positioned, in relation to HMD 112, in such a way that the imaginary normal drawn from wrist 702 intersects with the front rigid body of HMD 112. The configuration of wrist 702 may simulate or be substantially the same as a wrist configuration while holding a controller. In this way, artificial reality systems 10, 20 leverage a natural position for users, and may enable UI element gating even if the user is holding one or more controllers.

FIG. 8B illustrates a representation of hand 132 and wrist 702 in the virtual reality environment represented by artificial reality content 122. In response to gesture detectors 324, 424 identifying the gesture based on wrist 702 being substantially stationary and along the normal drawn from the front rigid body of HMD 112 for the threshold period of time, UI engines 328, 428 may generate a UI element in response to the identified gesture, and rendering engines 322, 422 may to render the UI element overlaid on an image of wrist 702. The representation of wrist 702 in the virtual environment with the UI element overlaid is shown by way of configuration 706 illustrated in FIG. 8B. In the example of FIG. 8B, UI engines 328, 428 generate, and rendering engines 322, 422 render, the UI element in the form of menu 708. In other implementations, UI engines 328, 428 may generate different UI elements in response to gesture detectors 324, 424 identifying the gesture indicated by configuration 704 in which wrist 702 is substantially stationary for at least the threshold period of time and positioned such that the normal from wrist 702 is facing HMD 112.

In some instances, in which rendering engines 322, 422 overlay menu 708 on the image of wrist 702, gesture detectors 324, 424 may detect a touch gesture at a portion of menu 708 that appears overlaid on the image of wrist 702. For example, user 110 may use his/her other hand (not hand 132) to select the portion of menu 708 and provide self-haptic feedback by making contact or by occluding, in a contactless manner, a point of wrist 702. In these examples, UI engines 328, 428 may map the contact point or occlusion point in the image data representing the physical environment to a point on menu 708 as shown in the virtual environment of artificial reality content 122. Based on the location of the mapped point on menu 708, artificial reality systems 10, 20 may identify a particular user-selectable option to invoke, in response the input received from user 110.

For example, artificial reality systems 10, 20 may invoke gesture detectors 324, 424 to identify a selection gesture that indicates the input described above. In response to gesture detectors 324, 424 identifying the selection gesture, and based on the corresponding coordinates of the haptic input on menu 708, UI engines 328, 428 may generate an updated UI element, e.g., in the form of menu 708 with a selected option and/or with a set of further selectable options in view of the option that was previously selected via the selection input. In this way, artificial reality systems 10, 20 utilize the gesture of user 110 gazing, uninterrupted, at his/her own wrist for a certain period of time, to gate UI elements such as menu 708, thereby providing user 110 with selectable options within the virtual environment represented by artificial reality content 122.

Figure 9A:
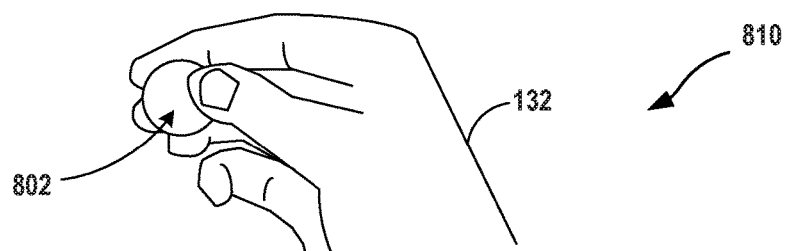
FIGS. 9A-9C illustrate various configurations of a hand that form a grip-and-throw gesture in response to which artificial reality systems of this disclosure may gate UI elements, in accordance with some aspects of this disclosure.
Figure 9B:
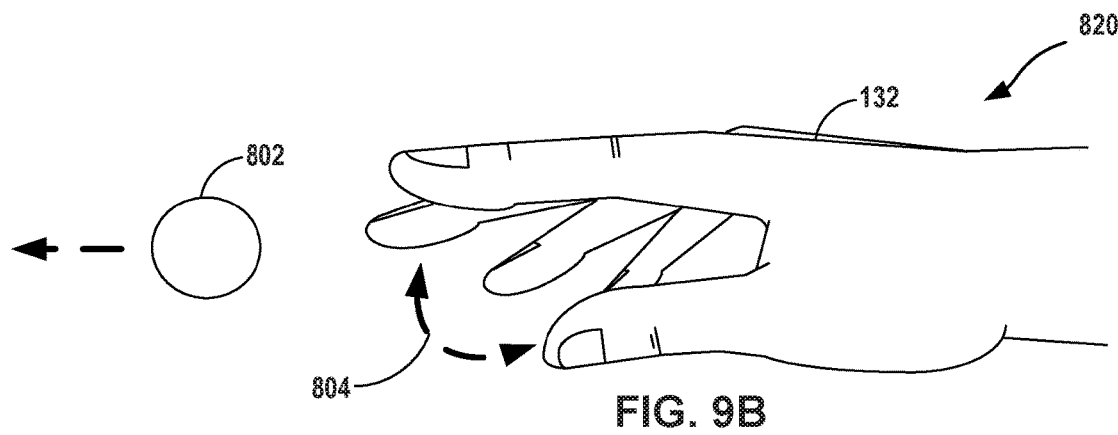
Figure 9C:
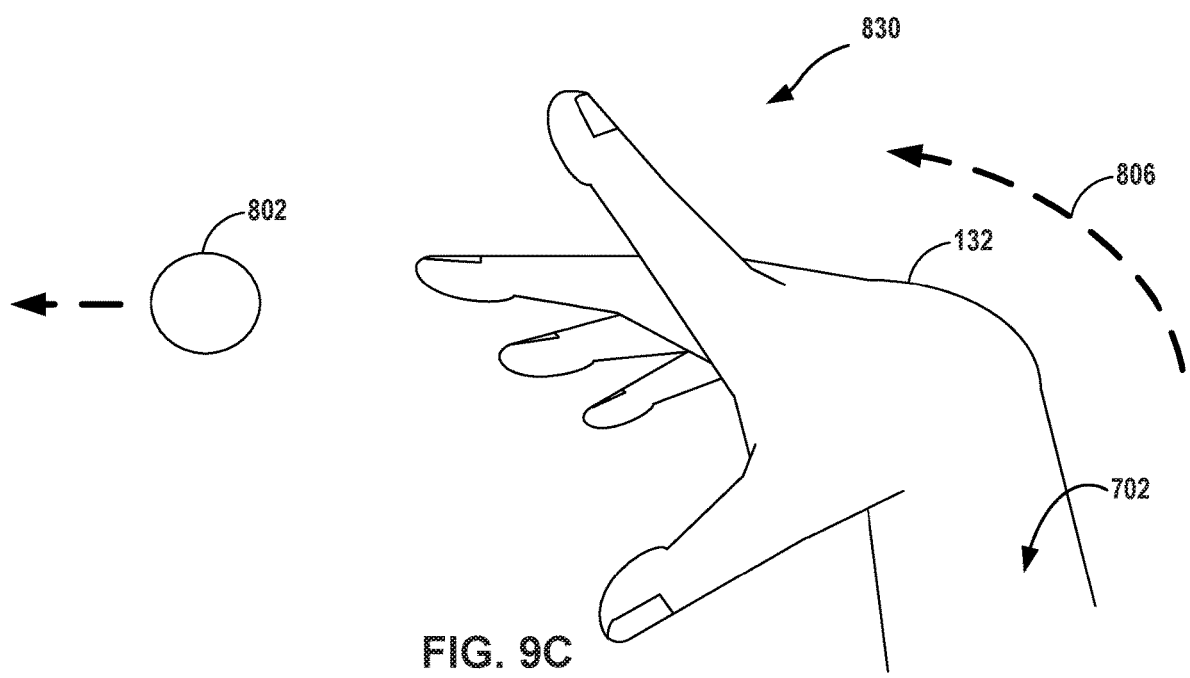

FIGS. 9A-9C illustrate various configurations of hand 132 that form a grip-and-throw gesture in response to which artificial reality systems 10, 20 may gate UI elements, in accordance with some aspects of this disclosure. In various implementations of this disclosure, UI engines 328, 428 may generate assistant element 802, and rendering engines 322, 422 may output assistant element 802 via electronic display 203 to appear within the virtual environment represented by artificial reality content 122. UI engines 328, 428 and rendering engines 322, 422 may output assistant element 802 to simulate a drone, in that assistant element 802 may appear to hover over or alongside an avatar representing user 110 in the virtual environment, and that navigates the virtual environment in synchrony with the avatar.

FIG. 9A illustrates gripping configuration 810 of hand 132. Gesture detectors 324, 424 may identify a gesture that includes a gripping motion of two or more digits of hand 132 to form gripping configuration 810 at a location that corresponds to assistant element 802. For instance, gesture detectors 324, 424 may detect the completion of the gripping motion of hand 132 by determining that the thumb of hand 132 at a location that corresponds to a first portion of assistant element 802, and determining that at least one finger of hand 132 other than the thumb is at a location that corresponds to a second portion of assistant element 802. For example, the first portion of assistant element 802 is at least approximately diametrically opposed to the second portion of assistant element 802. In this way, gesture detectors 324, 424 may detect the formation of gripping configuration 810 based on the digits of hand 132 forming a pincer (tip-to-tip) grip around the virtual location of assistant element 802, a pinch (pad-to-pad) grip around the virtual location of assistant element 802, a lumbrical grip (in which the digits contact locations corresponding to assistant element 802 but are not wrapped around it), etc.

Gesture detectors 324, 424 may detect the gating gesture if gesture detectors 324, 424 identify a sequence of the gripping motion of hand 132 to form gripping configuration 810 at the location corresponding to the virtual location of assistant element 802, followed by a throwing motion of hand 132 with respect to assistant element 802. Gesture detectors 324, 424 may detect the throwing motion by identifying a combination of a release of gripping configuration 810, and a particular movement of hand 132 and/or wrist 702. The particular movement may accompany, follow, or partially overlap with the release of gripping configuration 810.

FIG. 9B illustrates a throwing motion that gesture detectors 324, 424 by way of an outward flicking motion of one or more of the digits of hand 132. According to throwing configuration 820 of FIG. 9B, gesture detectors 324, 424 detect a release of gripping motion 810, in that gesture detectors 324, 424 determine that the thumb and the other fingers that formed gripping configuration 810 are no longer at the two positions (e.g., the substantially diametrically opposed positions) corresponding to the virtual location of assistant element 802. In the example of FIG. 9B, gesture detectors 324, 424 identify the subsequent throwing motion based on outward flicking motion 804.

Gesture detectors 324, 424 may detect outward flicking motion 804 based on a straightening of the phalanges of the thumb and the other finger(s) that formed gripping configuration 810, where the straightening satisfies a minimum speed so as to simulate a finger-based throw in a physical environment. To simulate the throwing motion with respect to a UI element such as assistant element 802, UI engines 328, 428 and rendering engines 322, 422 may update artificial reality content 122 to show movement of assistant element 802 away from hand 132, such as a movement that simulates assistant element 802.

FIG. 9C illustrates a throwing motion that gesture detectors 324, 424 by way of a flexion of wrist 702. According to throwing configuration 830 of FIG. 9C, gesture detectors 324, 424 detect a release of gripping motion 810, in that gesture detectors 324, 424 determine that the thumb and the other fingers that formed gripping configuration 810 are no longer at the two positions (e.g., the substantially diametrically opposed positions) corresponding to the virtual location of assistant element 802. In the example of FIG. 9C, gesture detectors 324, 424 identify the subsequent throwing motion based on wrist flexion 806.

Gesture detectors 324, 424 may detect flexion 806 based on a bending of wrist 702, along with or substantially concurrently with the release of gripping configuration 810, if the bending of wrist 702 satisfies a minimum speed so as to simulate a wrist-based toss of assistant element 802. While FIG. 9C illustrates throwing configuration 830 based on a bending movement of wrist 702 to perform flexion 806, it will be appreciated that, in other use case scenarios, gesture detectors 324, 424 may detect a throwing flexion based on a straightening motion of wrist 802. To simulate the throwing motion with respect to a UI element such as assistant element 802, UI engines 328, 428 and rendering engines 322, 422 may update artificial reality content 122 to show an abduction movement of assistant element 802, away from hand 132.

In various examples, in response to gesture detectors 324, 424 identifying the gating gesture comprising the gripping motion to form gripping configuration 810 followed by one or both of throwing motions 820, 830 UI engines 328, 428 and rendering engines 322, 422 gate a UI element within the virtual environment represented by artificial reality content 122. In some examples, the UI element includes at least one menu of user-selectable options. That is, UI engines 328, 428 may generate the UI element in response to the identification of the gesture, and rendering engines 322, 422 may render the UI element as an overlay to at least some of artificial reality content 122.

In some use case scenarios, gesture detectors 324, 424 identifies, after the rendering of the UI element as the overlay to artificial reality content 122, a press-and-hold gesture with respect to assistant element. For instance, gesture detectors 324, 424 may detect the placement of one of the digits of hand 132 at a location corresponding to the virtual location of assistant element 802, with the placement of these one or more digits remaining in place for at least a threshold period of time. That is, gesture detectors 324, 424 may identify the press-and-hold gesture by identifying of at least one of the digits of hand 132 being positioned at a location that corresponds to the assistant element in the artificial reality content and being substantially stationary for at least a threshold period of time.

Gesture detectors 324, 424 may identify the press-and-hold gesture as occurring after rendering engines 322, 422 render the UI element as the overlay to artificial reality content 122. In these examples, rendering engines 322, 422 may remove the overlay of the UI element from the artificial reality content in response to gesture detectors 324, 424 identifying the press-and-hold gesture at the location corresponding to the virtual location of assistant element 802. In this way, artificial reality systems 10, 20 may de-gate the UI element (e.g., the menu) based on input received from user 110 in the form the subsequent press-and-hold gesture.

Figure 10A:
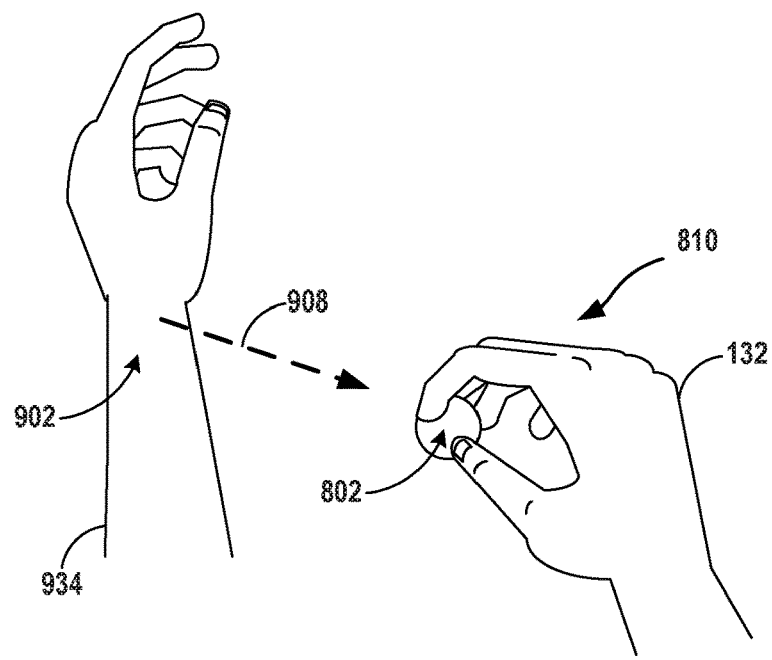
FIGS. 10A and 10B illustrate various configurations of a hand and an opposite arm that gesture detectors of this disclosure may use to detect gestures that generally correspond to gripping (or "holding" or "grabbing") gestures originating from predefined areas of the opposite arm.
Figure 10B:
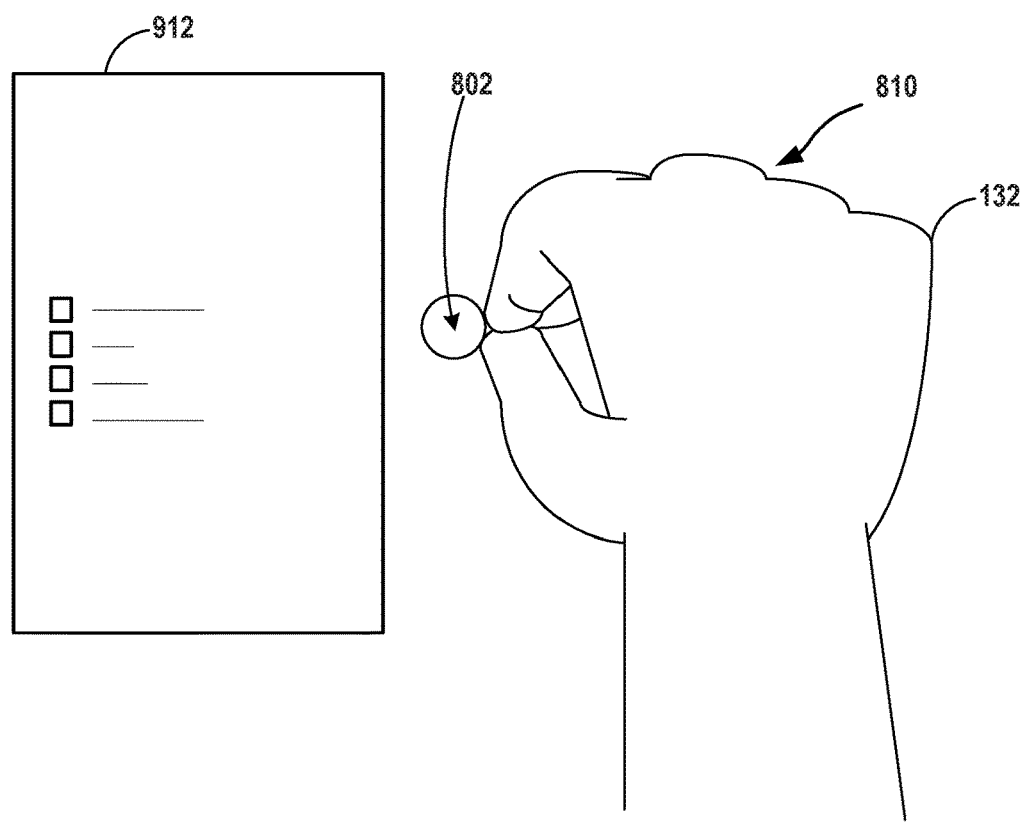

FIGS. 10A and 10B illustrate various configurations of hand 132 and opposite arm 934 that gesture detectors 324, 424 may use to detect gestures that generally correspond to gripping (or "holding" or "grabbing") gestures originating from predefined areas of opposite arm 934. For example, gesture detectors 324, 424 may detect the grip-and-pull gesture if the gesture originates at opposite wrist 902 of opposite arm 934. In the example of FIGS. 10A and 10B, UI engines 328, 428 generate and render assistant element 802 to appear to passively reside on opposite arm 934. That is, UI engines 328, 428, and rendering engines 322, 422 may output, as part of artificial reality content 122 that is displayed via electronic display 203, assistant element 802 such that assistant element 802 appears superimposed on and attached to opposite arm 934. For instance, UI engines 328, 428, and rendering engines 322, 422 may output assistant element 802 to appear superimposed on and attached to opposite wrist 902.

Gesture detectors 324, 424 may identify, from the image data received from image capture devices 138, a gesture that includes a gripping motion of hand 132 with respect to assistant element 802. That is, gesture detectors 324, 424 may detect a motion of the digits of hand 132 that bring the thumb and one or more other fingers together to form gripping configuration 810 of FIG. 9A, or other types of gripping (or "gripped" or "holding") configurations. In terms of gripping assistant element 802 in the virtual environment, the gripping motion includes the thumb of hand 132 being positioned to contact a first portion of assistant element 802, and at least one finger (other than the thumb) of hand 132 being positioned to contact a second portion of assistant element 802.

For instance, the first portion of assistant element 802 may be diametrically opposed or at least approximately diametrically opposed to the second portion of assistant element 802. Again, arm 134 is different from opposite arm 934, and hand 132 is part of arm 134. Arm 134 and opposite arm 934 represent the arms of user 110 in the virtual environment represented by artificial reality content 122. In one example, arm 134 represents the dominant arm of user 110, and opposite arm 934 represents the non-dominant arm of user 110.

In the particular example of FIG. 10A, gesture detectors 324, 424 identify the gesture based on identifying another motion, namely, pulling motion 908 while gripping configuration 810 is still intact. Pulling motion 908 represents an abduction moving away from opposite wrist 902. Gesture detectors 324, 424 may also identify additional motions while gripping configuration 810 is still intact, such as random movements of hand 132 caused by panning and/or vertical movement and/or depth-based translational movement of arm 134, caused by flexions of wrist 702, etc. In these examples, so long as gripping configuration 810 remains intact with respect to the two or more digits of hand 132 around the virtual representation of assistant element 802, UI engines 328, 428 and rendering engines 322, 422 may move assistant element 802 in synchrony with a movement of hand 132 within the virtual environment represented by artificial reality content 122.

FIG. 10B illustrates a scenario in which UI engines 328, 428 and rendering engines 322, 422 gate UI menu 912 based on a placement of assistant element 802 at a particular place within the virtual environment represented by artificial reality content 122. FIG. 10B illustrates an example in which UI engines 328, 428 and rendering engines 322, 422 gate UI menu 912 in response to a stoppage of pulling motion 908 of hand 132 while gripping configuration 810 is still intact. In other examples, UI engines 328, 428 and rendering engines 322, 422 may gate UI menu 912 in response to other stimuli, such as a determination by gesture detectors 324, 424 of a release of gripping configuration 810, etc. UI engines 328, 428 and rendering engines 322, 422 may gate various types of UI elements in response to these gestures detected by gesture detectors 324, 424.

UI menu 912 represents a menu of user-selectable options. UI engines 328, 428 and rendering engines 322, 422 output UI menu 912 as an overlay to artificial reality content 122 to appear within the virtual environment. In this example, gesture detectors 324, 424 may identify a subsequent gesture performed by hand 132 that represents a menu gating gesture. In some examples, gesture detectors 324, 424 may detect a scrolling movement that includes a translational movement of hand 132 approximately in parallel with a vertical axis or vertical surface of UI menu 912. The scrolling movement may represent a scrolling gesture in which a checkbox included in UI menu 912 that is approximately in parallel with hand 132 (or a horizontally-extended digit thereof), and UI engines 328, 428 may update the parallel checkbox to appear in "checked" form.

Figure 11:
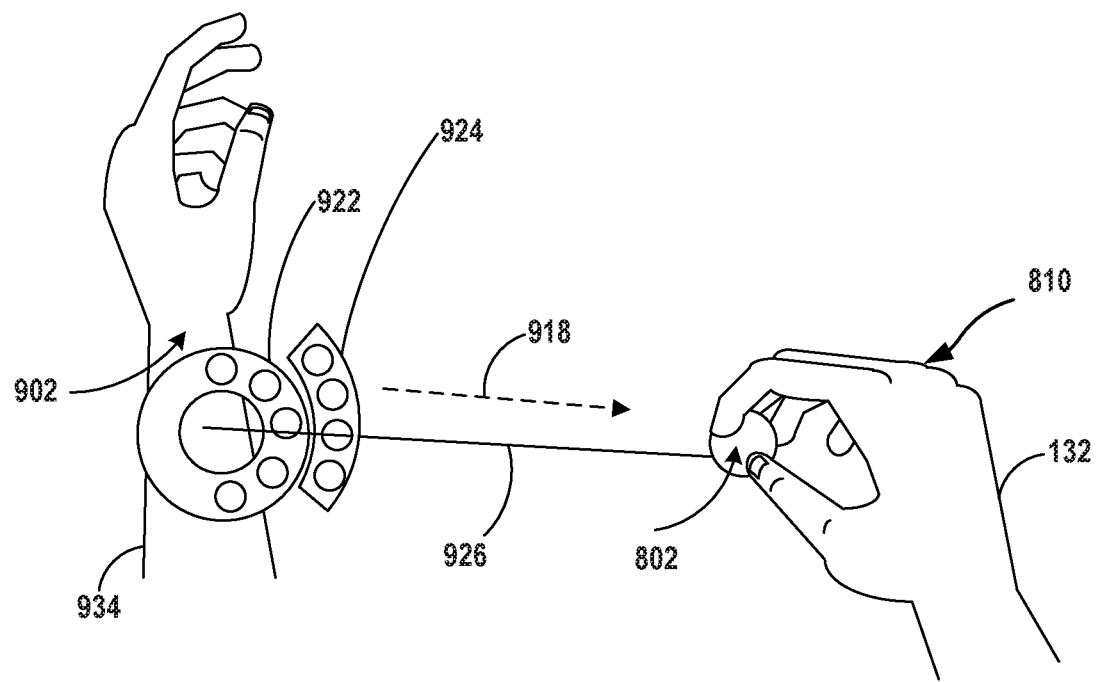
FIG. 11 illustrates a grip-and-pull gesture of a hand originating from an opposite wrist and UI elements that artificial reality systems of this disclosure may invoke in response to the identification of the grip-and-pull gesture.

FIG. 11 illustrates a grip-and-pull gesture of hand 132 originating from opposite wrist 902 and UI elements that artificial reality systems 10, 20 may invoke in response to the identification of the grip-and-pull gesture. In these examples, UI engines 328, 428 and rendering engines 322, 422 may output assistant element 802 as an overlay to the representation of opposite wrist 902 in the virtual environment represented by artificial reality content 122. Gesture detectors 324, 424 may identify the grip-and-pull gesture based on detecting a gripping motion of two or more digits of hand 132 to form gripping configuration 810 at a location that corresponds to assistant element 802 in the virtual environment, and pulling motion 918 of the two or more digits of hand 132 away from (e.g., generally normal to) opposite wrist 902 while in gripping configuration 810.

In response to the identification of the grip-and-pull gesture illustrated in FIG. 11, UI engines 328, 428 and rendering engines 322, 422 may gate rendering of a UI element, such as circular (radial) menu 922. In some examples, if pulling motion 918 terminates within a predefined distance from opposite wrist 902, UI engines 328, 428 and rendering engines 322, 422 may gate only circular menu 922. However, if pulling motion 918 terminates at any distance from opposite wrist 902 that is greater than the predefined distance, UI engines 328, 428 and rendering engines 322, 422 may provide finer granularity in terms of user-selectable options, by also gating rendering of granular menu 924. Granular menu 924 includes at least one additional user-selectable option not included in the set of user-selectable options presented via circular menu 922. In some such instances, granular menu 924 may include one or more sub-selections that represent options that become available after an option from circular menu 922 has been selected. In some such examples, pulling motion 918 may be depicted in the artificial reality content as a string or line, such as in the form of virtual tether 926. The detected motion shown as pulling motion 918 may include two distinct portions, namely, a first pulling motion that terminates within the predefined distance to gate circular menu 922, and a second pulling motion that goes beyond the predefined distance to gate granular menu 924 in addition to circular menu 922.

Upon detecting the grip-and-pull gesture, as described, and rendering circular menu 922 and, in some examples, granular menu 924, gesture detectors 324, 424 may further detect radial motions in a plane generally perpendicular to motion 918 (i.e., a radial motion with respect to an axis defined by motion 918). In response to detecting the radial motions UI engines 328, 428 renders display of assistant element 802 to select and deselect UI elements within circular menu 922 and/or granular menu 924.

Gesture detectors 324, 424 may also identify a cessation of contact between the thumb and the other gripping finger(s) of hand 132, thereby detecting a release of gripping configuration 810. In some such examples, UI engines 328, 428 and rendering engines 322, 422 may remove the overlay of circular menu 922 and (if gated) granular menu 924 in response to gesture detectors 324, 424 identifying the release of gripping configuration 810. In this way, the techniques of this disclosure described with respect to FIG. 11 simulate a drawer or filing cabinet in terms of invoking UI elements, with an added elastic or magnetic simulation in that the virtual drawer is "closed" upon the release of a hand grip.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, fixed function circuitry, programmable circuitry, whether alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

What is claimed is:

1. An artificial reality system comprising:
   an image capture device configured to capture image data representative of a physical environment;
   a head-mounted display (HMD) configured to output artificial reality content, the artificial reality content including a representation of a wrist;
   a rendering engine stored in a non-transitory computer-readable storage medium and executable by processing circuitry, the rendering engine configured to render a user interface (UI) element as an overlay to the representation of the wrist in the artificial reality content;
   a gesture detector stored in the non-transitory computer-readable storage medium and executable by processing circuitry, the gesture detector executable by processing circuitry, the gesture detector configured to identify, from the image data, a gesture comprising:
      a stationary position of the wrist for at least a threshold period of time;
      a gripping motion of two or more digits of a hand to form a gripping configuration at a location that corresponds to the UI element overlaid on the wrist, and
      subsequent to the two or more digits of the hand forming the gripping configuration, a pulling motion of the hand away from the wrist along a normal from the wrist to the image capture device while the two or more digits of the hand are in the gripping configuration; and
   a UI engine stored in the non-transitory computer-readable storage medium and executable by processing circuitry, the UI engine executable by processing circuitry, the UI engine configured to modify the UI element in response to the identified gesture to include a UI menu of user-selectable options.

2. The artificial reality system of claim 1, wherein the wrist is part of a first arm, and wherein the hand is part of a second arm different from the first arm.

3. The artificial reality system of claim 1, wherein to identify the gripping motion, the gesture detector is configured to identify a movement of a thumb of the hand contacting at least one non-thumb finger of the hand.

4. The artificial reality system of claim 3, wherein to identify the pulling motion, the gesture detector is configured to identify a movement of the hand away from the wrist along the normal from the wrist to the image capture device while the thumb is in contact the at least one non-thumb finger.

5. The artificial reality system of claim 1,
   wherein the UI menu is a first menu,
   wherein the pulling motion is a first pulling motion,
   wherein the gesture detector is further configured to:
      detect that the first pulling motion terminates at a first distance from the wrist, and
      identify a second pulling motion of the two or more digits, the second pulling motion beginning at the first distance from the wrist and terminating at a second distance from the wrist, the second distance being greater than the first distance, wherein the UI engine is further configured to modify a granularity of the UI menu to form a modified UI menu in response to the detection of the second pulling motion, and wherein the rendering engine configured to render the modified UI menu as part of the overlay.

6. The artificial reality system of claim 5, wherein the modified UI menu includes at least one additional user-selectable option not included in the user-selectable options of the UI menu.

7. The artificial reality system of claim 1,
wherein the gesture detector is further configured to identify a release of the gripping configuration, and
wherein the rendering engine is configured to remove the overlay of the UI element from the representation of the wrist in the artificial reality content in response to the detection of the release of the gripping configuration.

8. The artificial reality system of claim 7, wherein to identify the release of the gripping configuration, the gesture detector is configured to identify a cessation of contact between a thumb of the hand and a non-thumb finger of the hand.

9. The artificial reality system of claim 1, wherein to identify the gesture, the gesture detector is further configured to identify the gesture as corresponding to an entry in a gesture library.

10. The artificial reality system of claim 9, wherein the entry is included in one or more entries of the gesture library, each of the one or more entries corresponding to a predefined gesture.

11. A method comprising:
capturing, by a head-mounted display (HMD), image data representative of a physical environment;
outputting, by the HMD, artificial reality content including a representation of a wrist;
rendering, by a rendering engine stored in a non-transitory computer-readable storage medium and executable by processing circuitry, a user interface (UI) element as an overlay to the representation of the wrist in the artificial reality content;
identifying, by a gesture detector stored in a non-transitory computer-readable storage medium and executable by processing circuitry, from the image data, a gesture comprising:
a stationary position of the wrist for at least a threshold period of time;
a gripping motion of two or more digits of a hand to form a gripping configuration at a location that corresponds to the UI element overlaid on the wrist, and
subsequent to the two or more digits of the hand forming the gripping configuration, a pulling motion of the hand away from the wrist along a normal from the wrist to the HMD while the two or more digits of the hand are in the gripping configuration; and
modifying, by a user interface (UI) engine stored in a non-transitory computer-readable storage medium and executable by processing circuitry, the UI element in response to the identified gesture to include a UI menu of user-selectable options.

12. The method of claim 11, wherein the wrist is part of a first arm, and wherein the hand is part of a second arm different from the first arm.

13. The method of claim 11, wherein identifying the gesture comprises identifying, by the gesture detector, the gesture as corresponding to an entry in a gesture library.

14. The method of claim 11, wherein identifying the gripping motion comprises identifying, by the gesture detector, a thumb of the hand contacting at least one non-thumb finger of the hand.

15. The method of claim 14, wherein identifying the pulling motion comprises identifying, by the gesture detector, a movement of the hand away from the wrist along the normal from the wrist to the image capture device while the thumb is in contact with the at least one non-thumb finger.

16. The method of claim 11, wherein the UI menu is a first menu, wherein the pulling motion is a first pulling motion, the method further comprising:
detecting, by the gesture detector, that the first pulling motion terminates at a first distance from the wrist;
identifying, by the gesture detector, a second pulling motion of the hand, the second pulling motion beginning at the first distance from the wrist and terminating at a second distance from the wrist, the second distance being greater than the first distance;
modifying, by the UI engine, a granularity of the UI menu to form a modified UI menu in response to detecting the second pulling motion, and
rendering, by the rendering engine, the modified UI menu as part of the overlay.

17. The method of claim 16, wherein the modified UI menu includes at least one additional user-selectable option not included in the user-selectable options of the UI menu.

18. The method of claim 11, further comprising:
identifying, by the gesture detector, a release of the gripping configuration; and
removing, by the rendering engine, the overlay of the UI element from the representation of the wrist in the artificial reality content in response to the detection of the release of the gripping motion.

19. The method of claim 18, wherein identifying the release of the gripping configuration comprises identifying, by the gesture detector, a cessation of contact between the two or more digits of the hand that formed the gripping configuration.

20. A non-transitory computer-readable storage medium encoded with instructions that, when executed, cause processing circuitry of an artificial reality system to:
receive, from a head-mounted display (HMD), image data representative of a physical environment;
output, via the HMD, artificial reality content including a representation of a wrist; render a user interface (UI) element as an overlay to the representation of the wrist in the artificial reality content;
identify, from the image data, a gesture comprising:
a stationary position of the wrist for at least a threshold period of time;
a gripping motion of two or more digits of a hand to form a gripping configuration at a location that corresponds to the UI element overlaid on the wrist, and
subsequent to the two or more digits of the hand forming the gripping configuration, a pulling motion of the hand away from the wrist along a normal from the wrist to the HMD while the two or more digits of the hand are in the gripping configuration; and
modify the UI element in response to the identified gesture to include a UI menu of user-selectable options.

* * * * *